(12) United States Patent
Nagata et al.

(10) Patent No.: US 6,342,931 B2
(45) Date of Patent: *Jan. 29, 2002

(54) ACTIVE-MATRIX SUBSTRATE AND INSPECTING METHOD THEREOF

(75) Inventors: Hisashi Nagata, Nara; Takayuki Shimada, Yamatokoriyama; Yoshimitsu Tajima, Nara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,020

(22) Filed: Mar. 11, 1999

(30) Foreign Application Priority Data

Mar. 20, 1998 (JP) .............................. 10-072760

(51) Int. Cl.$^7$ ..................... G02F 1/1333; G02F 1/1343
(52) U.S. Cl. .............. 349/54; 349/40; 349/55
(58) Field of Search ............................. 349/40, 41, 54, 349/55

(56) References Cited

U.S. PATENT DOCUMENTS

| 5,585,949 A | * | 12/1996 | Yamazaki et al. ............. 349/41 |
| 5,671,026 A | * | 9/1997 | Shiraki et al. ................. 349/40 |
| 5,936,687 A | * | 8/1999 | Lee ............................... 349/40 |
| 6,122,030 A | * | 9/2000 | Nagata et al. ............... 349/153 |

FOREIGN PATENT DOCUMENTS

| JP | 172685/1983 | 10/1983 |
| JP | 106788/1988 | 5/1988 |

* cited by examiner

Primary Examiner—William L. Sikes
Assistant Examiner—Dung Nguyen
(74) Attorney, Agent, or Firm—Nixon & Vanderhye P.C.

(57) ABSTRACT

An active-matrix substrate is provided with a protecting circuit that connects adjacent spare wires in order to protect the substrate from an undesired high voltage that may be applied to the spare wires.

32 Claims, 10 Drawing Sheets

ACTIVE-MATRIX SUBSTRATE AND INSPECTING METHOD THEREOF

FIELD OF THE INVENTION

The present invention relates to an active-matrix substrate and an inspecting method thereof, more specifically, relates to the active-matrix substrate which is used for a device such as an active-matrix liquid crystal display device in which driving voltage is applied to a pixel electrode via a switching element and liquid crystal is driven in accordance with a potential difference between the pixel electrode and an opposing electrode so as to provide a display, and concerns the inspecting method thereof.

BACKGROUND OF THE INVENTION

Conventionally, an active-matrix liquid crystal display device has been arranged in a state in which individual pixel portions are independently disposed in a matrix form, and each pixel portion is provided with a pixel electrode and a switching element.

In the above-mentioned active-matrix liquid crystal display device, driving voltage is applied to the pixel electrode via the switching element, liquid crystal is driven in accordance with a potential difference between the pixel electrode and an opposing electrode which is disposed in a manner so as to oppose the pixel electrode via the liquid crystal, and transmitted light or reflected light is subjected to an optical modulation so as to display an image on the liquid crystal display panel.

In the above-mentioned liquid crystal display device, an MIM(Metal Insulator Metal) element or TFT(Thin Film Transistor) element has been used as the switching element. Especially, a liquid crystal panel using the TFT element has been most widely used as the active-matrix liquid crystal display device thanks to its quality and cost efficiency.

In the above-mentioned liquid crystal display device in which the TFT element is used, with regard to the pixel portions arranged in a matrix form, scanning lines for inputting a scanning signal which controls the switching element and signal lines for inputting a signal of an image which is to be displayed on the liquid crystal panel are vertically and horizontally disposed. Further, a between layer insulating film is formed between the scanning and signal lines and the pixel electrode.

In the liquid crystal display device having the above-mentioned construction, the between-layer insulating film allows the pixel electrode to be stacked on the scanning lines and the signal lines. Further, for example, Japanese Published Unexamined Patent Application No. 172685/1983 (Tokukaisho 58-172685, published on Oct. 11, 1983) discloses a liquid crystal display device which has the above-mentioned construction so as to improve an aperture rate of each pixel, and furthermore, so as to allow the insulating film to shield from electric field induced by a signal line, thereby reducing defects in alignment of liquid crystal.

Incidentally, a switching element such as the TFT element is generally weak against strong electric field. Therefore, static electricity appearing during a manufacturing process of the liquid crystal display device tends to destroy the TFT element. For example, the liquid crystal display device is provided with an alignment film made of polyimide that determines the alignment direction of the liquid crystal on the substrate. Further, the alignment film is rubbed with a cloth in one direction so as to determine the aligning direction of a liquid crystal molecule. At this time, static electricity appears by the rubbing operation.

When the scanning lines and signal lines on the substrate become charged by the static electricity, an influence is given on a crystal structure of a semiconductive layer within the TFT element. Therefore, the threshold of the TFT element is shifted by several volts. As a result, the switching operation of the switching element is not normally performed so that a portion which has received static electricity is recognized as a defected pixel.

In order to prevent the above-mentioned problem, in the manufacturing process of the substrate, each input terminal of the scanning lines and the signal lines is generally short-circuited by a metal pattern referred to as a short ring. However, after the active-matrix substrate and an opposing substrate have been bonded to each other so as to form the liquid crystal panel, the short ring is removed before peripheral circuits such as a driver have been installed on the input terminals. Therefore, the input terminal of the short ring is not appropriate for a measure against static electricity appearing during the installing process.

For this reason, in the vicinity of the input terminals of the scanning lines and/or the signal lines, protecting circuits are provided so as to connect the adjacent scanning lines and/or the adjacent signal lines.

FIG. 9 is a plan view schematically showing the construction of a conventional active-matrix substrate 51. The liquid crystal panel has a construction in which an active-matrix substrate 51 and an opposing substrate 52 are bonded to each other with a sealing member(not shown), and liquid crystal (not shown) is sealed into a gap between the substrates 51 and 52.

On the active-matrix substrate 51, a plurality of scanning lines 53 and a plurality of signal lines 54 are vertically and horizontally disposed. Each of the areas divided by the scanning lines 53 and the signal lines 54 is referred to as a pixel portion 55, and an effective display area 56 is constituted by the pixel portions 55 which are disposed in a matrix form.

Furthermore, on the active-matrix substrate 51, a plurality of spare wires 57 are disposed on the input side and the non-input side of the signal lines 54.

Additionally, on the active-matrix substrate 51, a scanning-line input terminal 58 and a signal-line input terminal 59 are respectively formed on each end of the scanning lines 53 and each end of the signal lines 54. And protecting circuits 60 are formed so as to connect the adjacent scanning lines 53 and to connect the adjacent signal lines 54 on the active-matrix substrate 51.

The protecting circuit 60 is, for example, formed by using a switching element adopting a diode. Namely, as shown in FIG. 10, the two switching elements are arranged in parallel in the opposite direction from each other so as to form a diode ring structure, which serves as the protecting circuit 60. The protecting circuits 60 are arranged in a manner so as to connect the adjacent scanning lines 53 and to connect the adjacent signal lines 54.

For example, Japanese Published Unexamined Patent Application No. 106788/1988 (Tokukaisho 63-106788, published on May 11, 1988) discloses the above-mentioned construction. With this arrangement, even in the case when an electric field exceeding a certain value is concentrated on a certain portion, the electric charge can be released to the adjacent scanning line 53 and the adjacent signal line 54; thus, it is possible to prevent defects caused by the aforementioned electrostatic destruction.

Moreover, as shown in FIG. 9, the active-matrix substrate 51 is provided with a plurality of terminals 61 for a lighting inspection. The active-matrix substrate 51 is cut along a division line 62 upon completion of the lighting inspection so that the terminals 61 are removed.

As shown in FIG. 9, the spare wires 57 are normally disposed outside the effective display area 56 so as to intersect the end portions of the signal lines 54 and/or the scanning lines 53. Therefore, in many cases, terminal portions 63 of the spare wires 57 are placed closer to the corners of the liquid crystal panel as compared with the terminals 58, 59, and 60 of the scanning lines 53 and the signal lines 54. Hence, upon handling the panel, the terminal portions 63 of the spare wires 57 tend to come into contact with static electricity prior to other portions. Thus, in the case when the panel comes into contact with an object which is electrostatically charged, or in the case when the panel has been electrostatically charged and the terminal portions 63 of the spare wires 57 come into contact with the object so that the object is subjected to an electric discharge, high voltage tends to be applied to the spare wires 57.

However, the conventional protecting circuits 60 are provided in order to prevent an electrostatic destruction of the TFT elements so that the spare wires 57, which have no semiconductor element thereon, are not provided with the protecting circuits 60.

Incidentally, the spare wires 57 are connected with the signal lines 54 and the scanning lines 53 by using laser, only after defects have been found on the signal lines 54 and/or the scanning lines 53. Thus, the spare wires 57 are normally arranged so as not to be electrically connected with the signal lines 54 and the scanning lines 53. Therefore, the impedance is extremely high. In the case when high voltage is applied from terminal portions 63, etc. due to static electricity, puncture caused by the high voltage appears at intersecting portions 64, which are the intersections of the spare wires 57 and the signal lines 54 and/or the scanning lines 53, and which is provided for a connection with laser. As a result, electric problems appear in some cases.

Further, even in the case when puncture does not occur at the intersecting portions 64, the potential of the signal lines 54 and/or the scanning lines 53 partially increases up to around the potential of the spare wires 57. Consequently, a problem occurs in the operation of the TFT element disposed on each of the pixel portions 55.

SUMMARY OF THE INVENTION

The objective of the present invention is to provide an active-matrix substrate which prevents puncture from occurring at the intersections of spare wires and signal lines or scanning lines and prevents degradation in a property of TFT elements that is caused by a surge of potential, and to provide an inspecting method thereof.

In order to achieve the above-mentioned objective, the active-matrix substrate of the present invention is characterized by: a substrate, a plurality of scanning lines which are disposed in parallel on the substrate, signal lines which are arranged in parallel so as to intersect the scanning lines on the substrate, a plurality of spare wires which are arranged on the input side and non-input side of the signal lines and/or the scanning lines so as to intersect the signal lines and/or the scanning lines, and first protecting circuits which connect the adjacent spare wires so as to prevent an undesired high voltage from being applied to the spare wire.

With the above-mentioned arrangement, in the case when an object which has been electrostatically charged comes into contact with one of the spare wires, or in the case when one of the spare wires comes into contact with an object which has been grounded or an object having a large capacity in a state in which the panel bears electric charge, the first protecting circuit allows the electric charge to be released to the adjacent spare wire so that it is possible to prevent an electric field from being concentrated on a certain spare wire. This effect is realized by the following function: relative to a certain amount of electric charge, the capacitance increases in accordance with the number of spare wires connected with the first protecting circuits so that the voltage caused by the electric charge is effectively reduced.

Therefore, it is possible to prevent puncture from occurring at the intersections of the spare wires and the signal lines or the scanning lines, and to prevent degradation in properties of the TFT elements that is caused by a surge of potential.

Further, with the above-mentioned arrangement, the active-matrix substrate of the present invention is also allowed to be provided with terminals connected with the scanning lines for the lighting inspection, terminals connected with the signal lines for the lighting inspection, terminals connected with the spare wires for the lighting inspection, and fourth protecting circuits for connecting the adjacent spare wires, in an area which is to be cut off upon completion of the lighting inspection.

The above-mentioned arrangement is provided with the fourth protecting circuit; therefore, it is possible to prevent puncture from occurring at the intersections of the spare wires and the signal lines or the scanning lines, and to prevent degradation in property of the TFT elements that is caused by a surge of the potential.

In the case when defects are found on lines in the lighting inspection, it is necessary to electrically inspect whether the spare wires are connected with the signal lines or the scanning lines with sufficiently low resistance by using laser. Thus, it is not possible to leave a short circuit among a plurality of the spare wires and between the spare wires and the signal lines or the scanning lines. Therefore, the conventional arrangement has the spare wires which are electrically independent from each other, thereby offering less protection against static electricity than the signal lines and the scanning lines.

The above-mentioned arrangement is provided with the fourth protecting circuits so that it is possible to effectively protect the spare wires from static electricity in a more positive manner. Further, the fourth protecting circuits are disposed in an area which is to be cut off upon completion of the lighting inspection so that the fourth protecting circuits are cut off before a displaying operation; thus, the fourth protecting circuits are free from a restraint in which the resistance value needs to be not less than 2 MΩ. Namely, the fourth protecting circuit merely needs to have a resistance which is sufficiently high for determining whether the resistance at the connected portion is sufficiently low or not upon correcting the above-mentioned defects on lines by using laser. High reliability is not required. Thus, any problems are not caused even when an extremely large channel width is arranged for releasing a large amount of static electricity.

Furthermore, as described above, in the liquid crystal panel, a lighting inspection is performed before the external circuits have been installed. At this time, generally, some or all the signal lines are supplied with the same signal, or a plurality of the scanning lines are electrically bundled in a simple manner so that the inspection is carried out in a simpler manner with more efficiency. Therefore, an area, which is to be cut off upon completion of the lighting inspection, is provided with terminals which are connected with some or all the signal lines for the lighting inspection, and terminals which are connected with a plurality of the scanning lines for the lighting inspection. Upon completion of the lighting inspection, these terminals are cut off from the signal lines and the scanning lines so as to allow each of the signal lines and the scanning lines to become electrically independent.

Furthermore, an inspecting method of the active-matrix substrate is characterized by including a step of determining voltage applied to a resistance measuring device, which measures loop resistance, so as to allow the resistance value of the fourth protecting circuit to be more than 20 times the resistance value of one spare wire.

The above-mentioned method makes it possible to readily determine whether the resistance is sufficiently low at the connecting portion upon correcting defects on lines by using laser.

In the case when defects are found on lines, it is necessary to electrically inspect whether the spare wires are connected with sufficiently low resistance after the spare wires have been connected by using laser. In this case, this inspection is performed as follows: after a correction has been made by using the adjacent spare wires, loop resistance is measured between the adjacent spare wires via a portion connected by using laser.

For this reason, the resistance value via the fourth protecting circuit needs to be sufficiently larger than the loop resistance in order to find a correct resistance of the connection. Therefore, voltage applied to the resistance measuring device is determined so as to allow the resistance value of the fourth protecting circuit disposed between the spare wires to exceed 20 times the resistance value of one spare wire; thus, it is possible to smoothly inspect the resistance.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

Referring to FIGS. 1 through 7, the following explanation describes one embodiment of the present invention.

Figure 1:
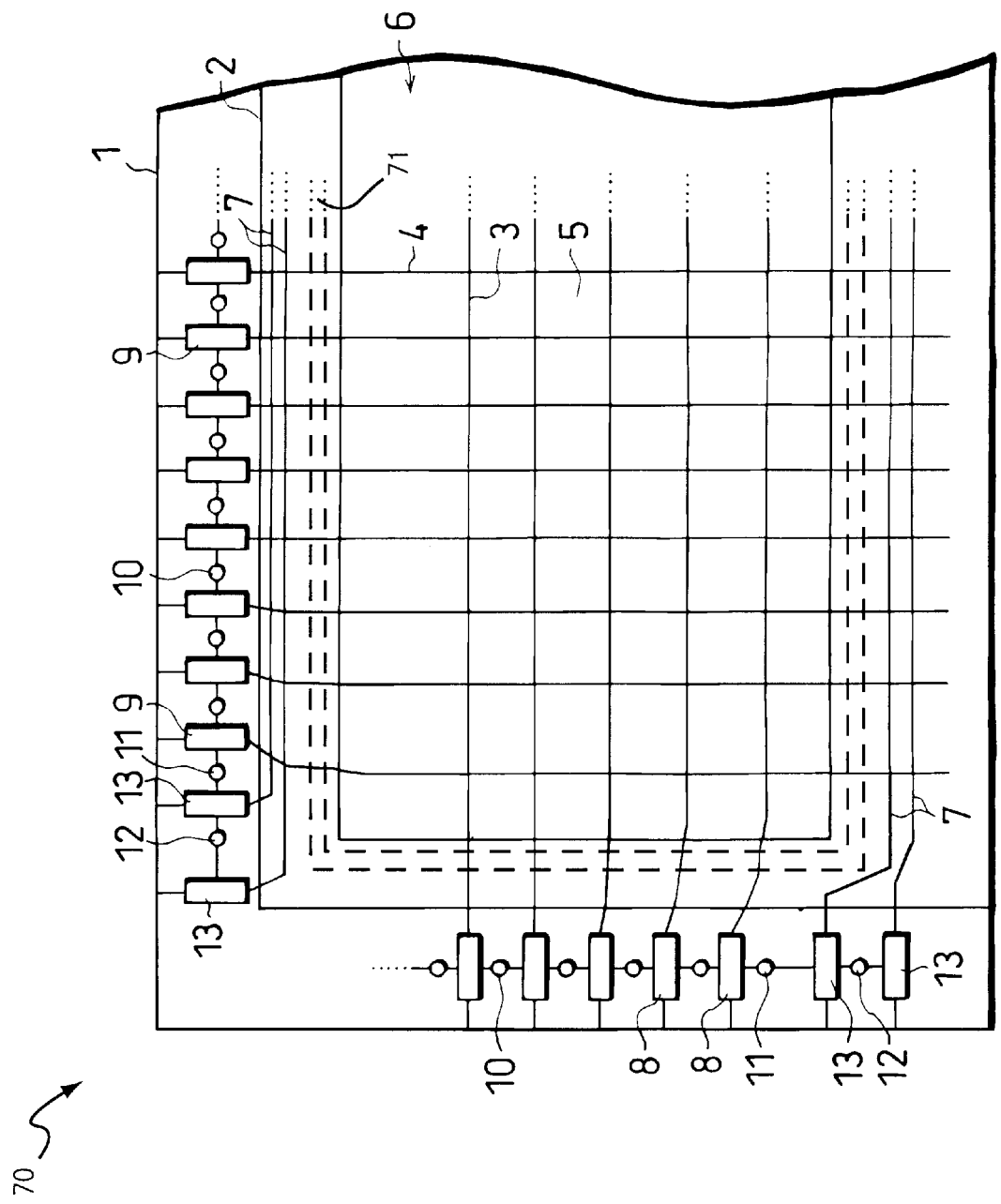
FIG. 1 is a plan view schematically showing a construction of an active-matrix substrate in accordance with one embodiment of the present invention.

FIG. 1 is a plan view schematically showing a construction of an active matrix substrate 1 in accordance with the present embodiment. The active-matrix substrate 1 is used for a liquid crystal panel of a liquid crystal display device 70. The liquid crystal panel has a construction in which the active-matrix substrate 1 and an opposing substrate 2 are bonded to each other with a sealing member 71, and liquid crystal (not shown) is sealed into a gap between the substrates 1 and 2.

On the active-matrix substrate 1, a plurality of scanning lines 3 and a plurality of signal lines 4 are disposed so as to intersect one another, and furthermore, the input side and the non-input side of the signal lines 4 are respectively provided with a plurality of spare wires 7. Each of the areas divided by the scanning lines 3 and the signal lines 4 is referred to as a pixel portion 5, and the pixel portions 5 are arranged in a matrix form so as to constitute an effective display area 6.

On the active-matrix substrate 1, the ends of the scanning lines 3 and the signal lines 4 are respectively provided with scanning line input terminals 8 and signal line input terminals 9. Each end of the spare wires 7 is provided with a terminal 13. Further, between the adjacent scanning lines 3 and between the adjacent signal lines 4 on the active-matrix substrate 1, protecting circuits 10 are formed in a manner so as to connect the adjacent scanning lines 3 and to connect the adjacent signal lines 4.

The active-matrix substrate 1 of the present embodiment is further provided with protecting circuits 12 between a plurality of the spare wires 7, and protecting circuits 11 between the spare wire 7 and the scanning line 3 and between the spare line 7 and the signal line 4. This arrangement will be described later.

Figure 2:
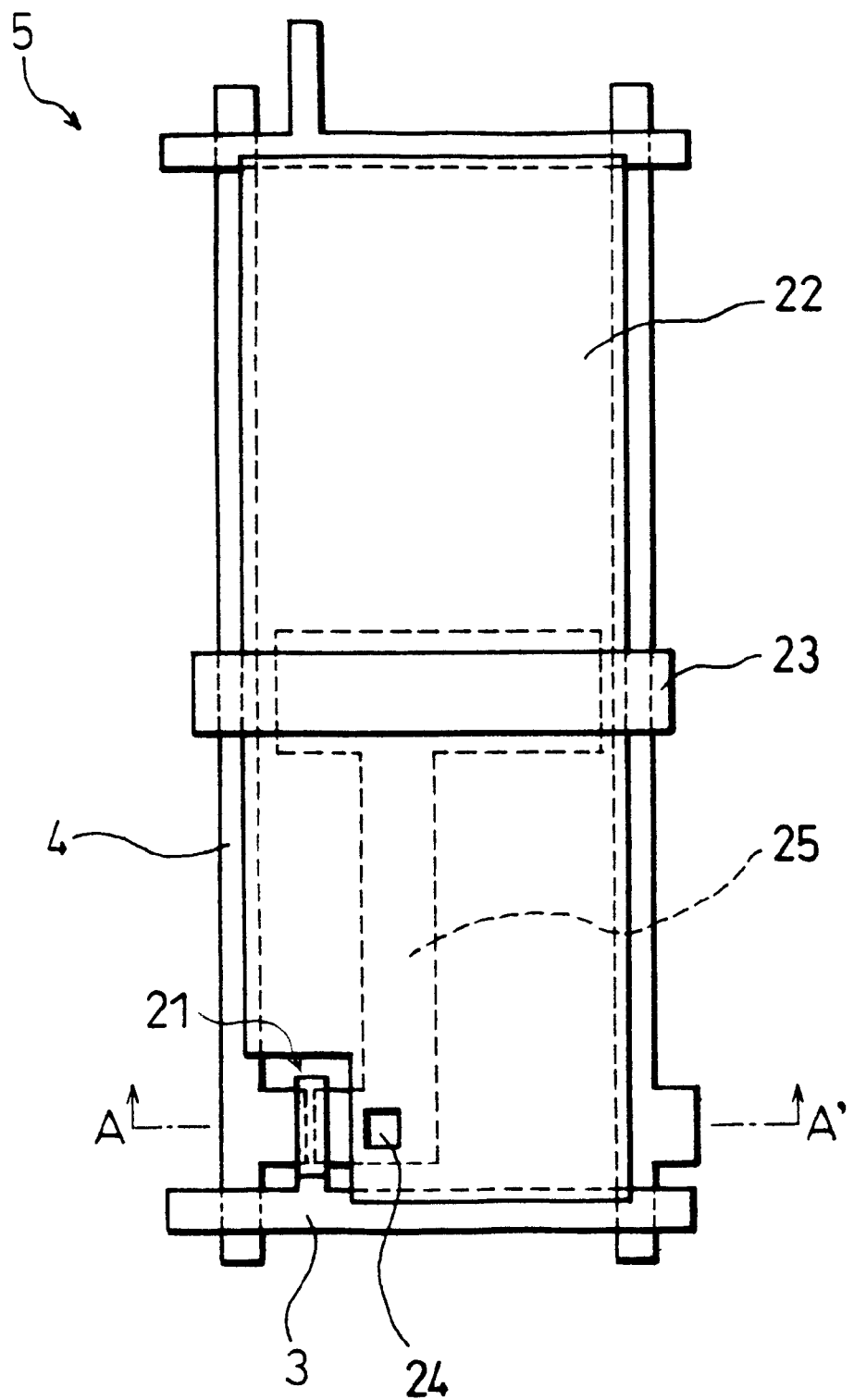
FIG. 2 is a plan view showing a pixel portion of the active-matrix substrate.

FIG. 2 is a plan view of the pixel portion 5 formed on the active-matrix substrate 1. As shown in FIG. 2, within the pixel portion 5 formed by a division by the scanning line 3 and the signal line 4, a TFT element 21, a pixel electrode 22, an auxiliary capacity wire 23, a contact hole 24, and a transparent conductive film 25 are formed.

The scanning line 3 is connected with a gate electrode of the TFT element 21. The signal line 4 is connected with a source electrode of the TFT element 21. A drain electrode of the TFT element 21 is connected with the pixel electrode 22, and further, one terminal of the auxiliary capacity of the pixel portion 5 via the transparent conductive film 25. The auxiliary capacity wire 23 serves as the other terminal of the auxiliary capacity. The auxiliary capacity wire 23 is connected with an opposing electrode(not shown) which is disposed in a manner so as to oppose the pixel electrode 22. The pixel electrode 22 is connected with the drain electrode of the TFT element 21 via the contact hole 24 formed in a manner so as to penetrate a between-layer insulating film 32, which will be described later.

Figure 3:
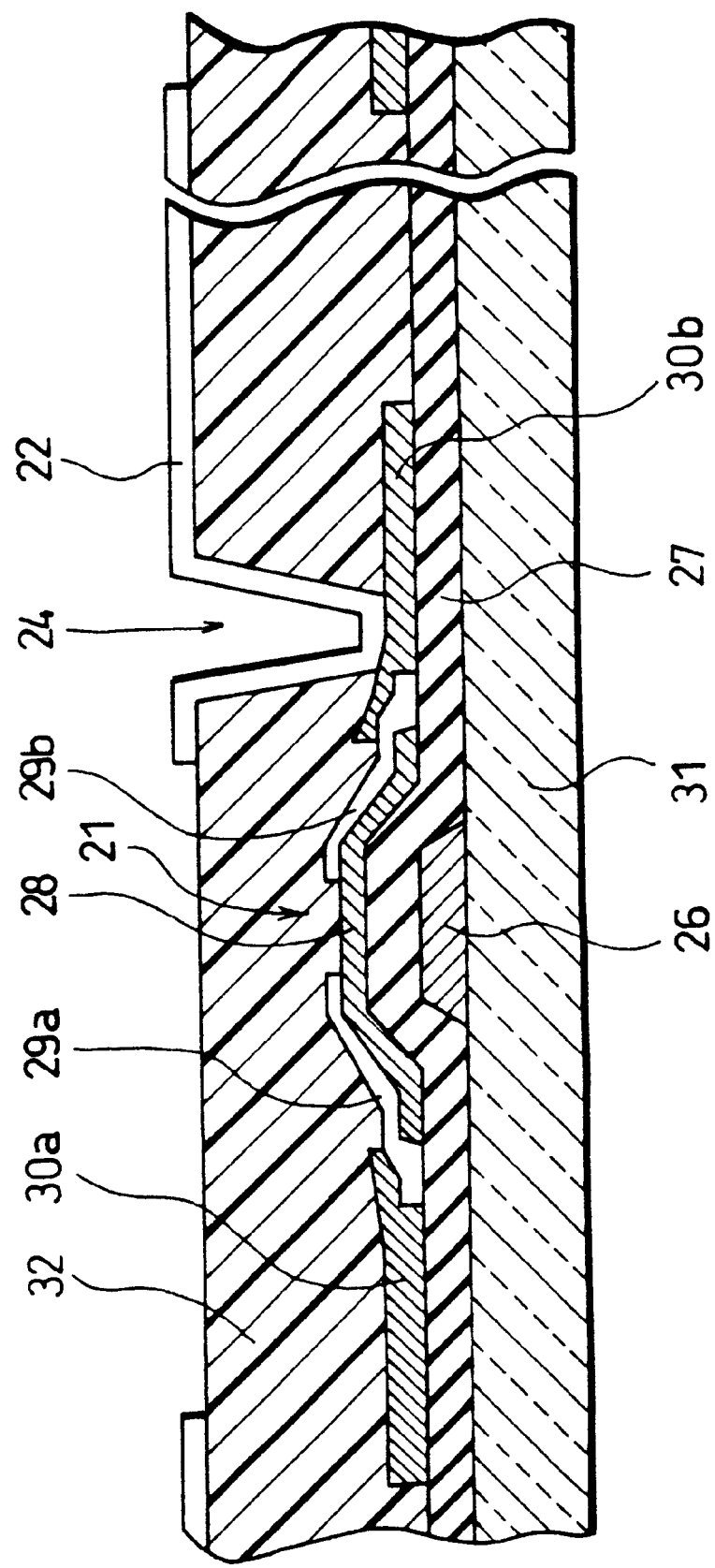
FIG. 3 is an III—III sectional view showing the pixel portion of FIG. 2.

The TFT element 21, which has a construction shown in FIG. 3, is formed as follows: A gate electrode 26 is formed on a transparent insulating substrate 31 made of glass and so on, and a gate insulating film 27 is formed in a manner so as to cover the insulating substrate 31 and the gate electrode 26. Above the gate electrode 26, a semiconductive thin film 28 is formed via the gate insulating film 27. A source electrode 29a constituted by an $n^+$-silicon layer is formed on the source section of the semiconductive thin film 28, and a drain electrode 29b constituted by an $n^+$-silicon layer is formed on a drain section of the semiconductive thin film 28. The source electrode 29a is connected with a metal layer 30a serving as a source wire, and the drain electrode 29b is connected with a metal layer 30*b* serving as a drain wire. The surface of the TFT element 21 is covered with the between-layer insulating film 32. Further, the pixel electrode 22 is formed on the between-layer insulating film 32. The pixel electrode 22 is connected with the metal layer 30*b* placed on the drain side of the TFT element 21, via the contact hole 24.

Figure 4:
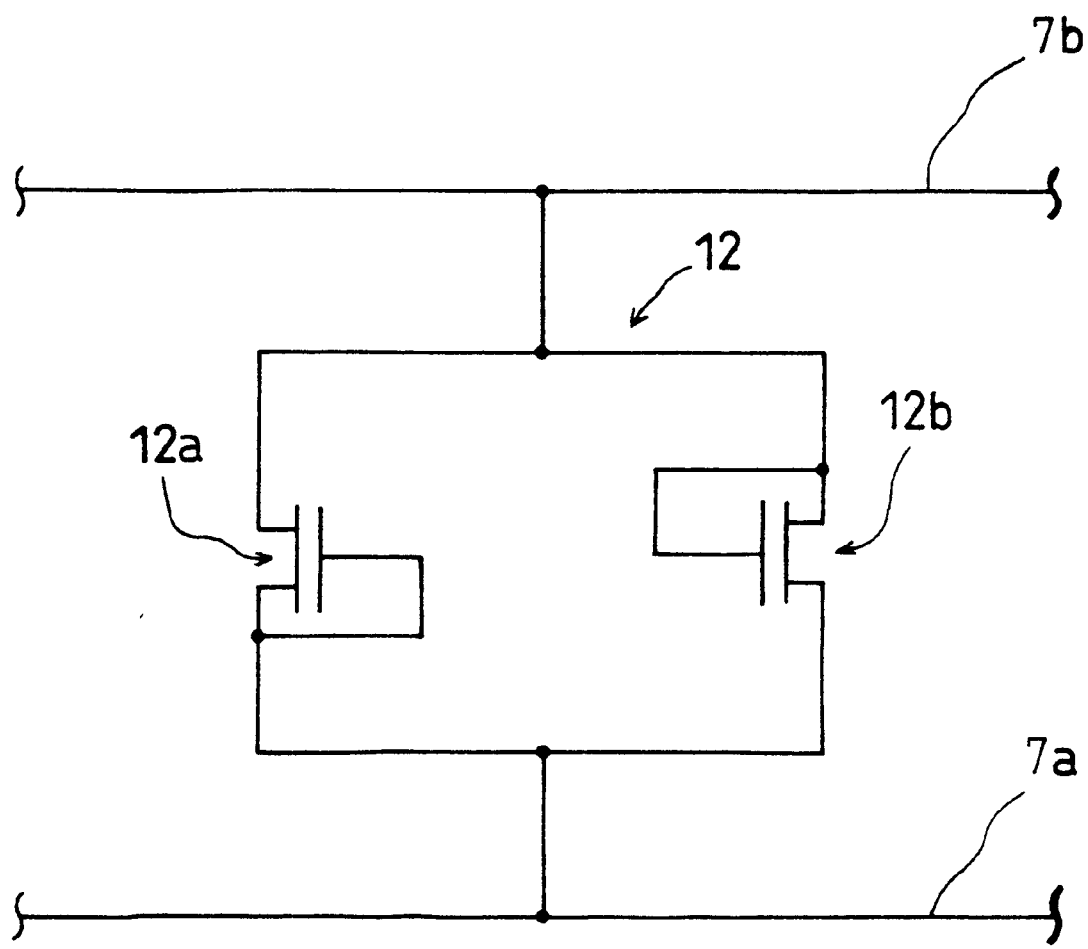
FIG. 4 is a circuit diagram showing a protecting circuit disposed in the active-matrix substrate.

As shown in FIG. 4, each of the protecting circuits 10 through 12 has a diode ring structure in which the switching elements 12*a* and 12*b* (semiconductor element) are connected in parallel in the opposite direction from each other, each of the switching elements 12*a* and 12*b* being connected with a diode.

Figure 5:
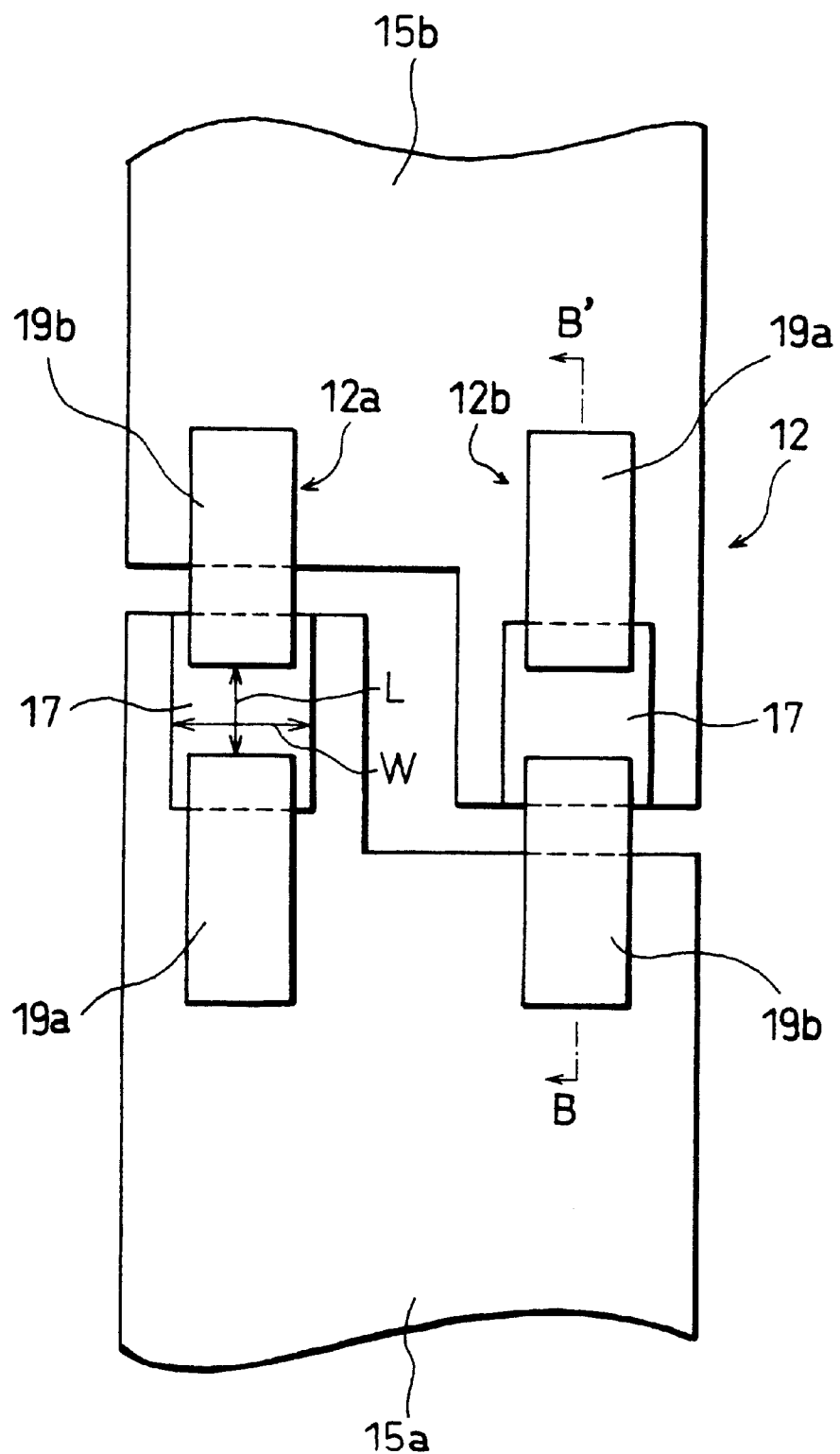
FIG. 5 is a plan view showing the protecting circuit of the FIG. 4.
Figure 6:
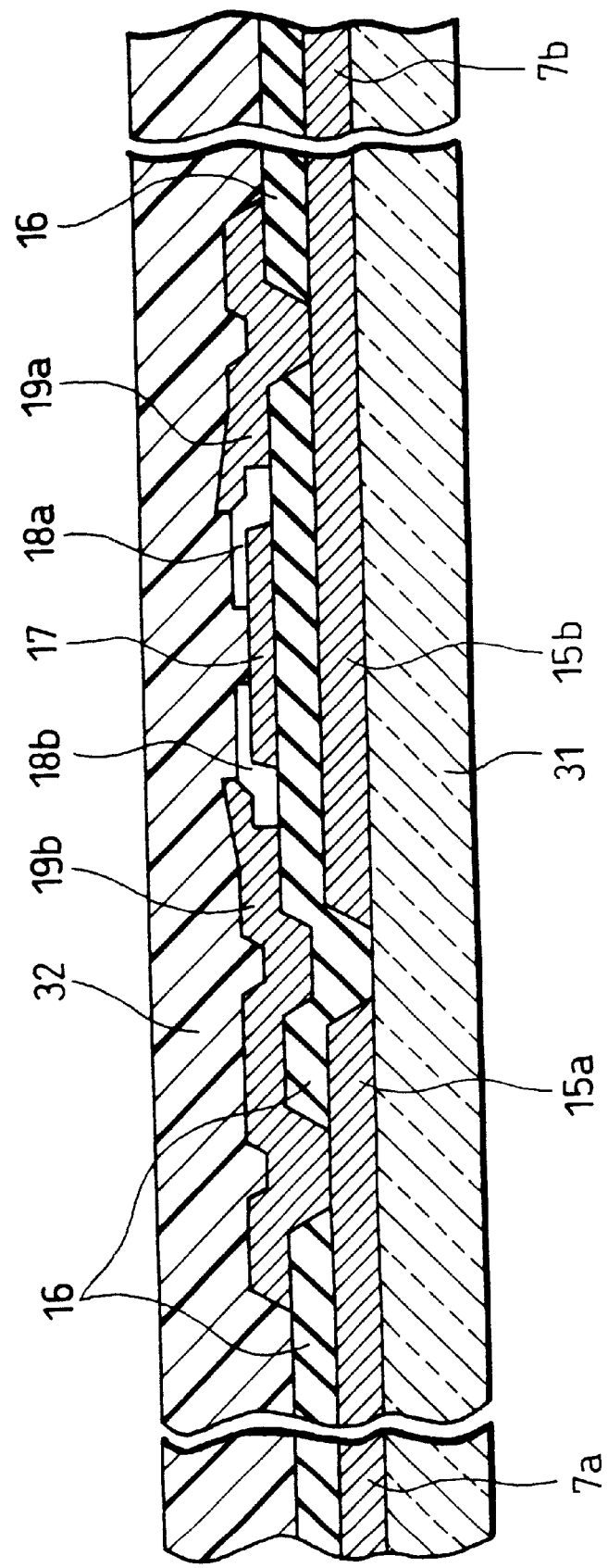
FIG. 6 is a VI—VI sectional view showing the protecting circuit of FIG. 5.

As described above, the protecting circuits 10 are provided between the adjacent scanning lines 3 and between the adjacent signal lines 4, the protecting circuits 12 are provided between the adjacent spare wires 7, and the protecting circuits 11 are provided between the spare wire 7 and the scanning line 3 and between the spare wire 7 and the signal wire 4. Each of the protecting circuits 10 through 12 has the same construction. Referring to FIGS. 4 through 6, the following explanation shows a construction of the protecting circuit 12 as an example, that is provided between adjacent spare wires 7*a* and 7*b* of the spare wires 7 in order to describe the constructions of the protecting circuits 10 through 12.

In the switching element 12*a*, the source section and the gate section are short-circuited, and the both sections are electrically connected with the drain section of the switching element 12*b* and the spare wire 7*a*. The drain section of the switching element 12*a* is electrically connected with the spare wire 7*b* and the source section and the gate section of the switching element 12*b*.

Meanwhile, in the switching element 12*b*, the source section and the gate section are short-circuited, and both sections are electrically connected with the drain section of the switching element 12*a* and the spare wire 7*b*. The drain section of the switching element 12*b* is electrically connected with the spare wire 7*a* and the source section and the gate section of the switching element 12*a*.

As shown in FIG. 5, the switching element 12*a* has a construction in which the semiconductive thin film 17, etc. is provided on a metal film 15*a* which is integrally formed with the spare wire 7*a*. The source section of the semiconductive thin film 17 is connected with a metal layer 19*a* serving as a source wire, and the drain section is connected with a metal layer 19*b* serving as a drain wire. The metal layer 19*b* is connected with a metal film 15*b* which is integrally formed with the spare wire 7*b*.

Meanwhile, the switching element 12*b* has a construction in which the semiconductive thin film 17, etc. is provided on the metal film 15*b* which is integrally formed with the spare wire 7*b*. The source section of the semiconductive thin film 17 is connected with the metal layer 19*a* serving as a source wire, the drain section is connected with the metal layer 19*b* serving as a drain wire. The metal layer 19*b* is connected with the metal film 15*a*.

As shown in FIG. 6, in the switching elements 12*a* and 12*b*, the metal films 15*a* and 15*b* are separately formed on the insulating substrate 31, and the gate insulating film 16 is formed in a manner so as to cover the metal films 15*a* and 15*b*. Above one of the metal films 15*a* and 15*b* serving as a gate electrode, the semiconductive thin film 17 is formed via the gate insulating film 16. A source electrode 18*a* constituted by an n$^+$-silicon layer is formed on the source section of the semiconductive thin film 17, and a drain electrode 18*b* constituted by an n$^+$-silicon layer is formed on the drain section.

The metal layer 19*a* serving as a source wire is connected with the source electrode 18*a*, and the metal layer 19*b* serving as a drain wire is connected with the drain electrode 18*b*. And the between-layer insulating film 32 is formed in a manner so as to cover the switching elements 12*a* and 12*b*.

In the above-mentioned protecting circuit 12, in the case when the spare wire 7*a* become charged with static electricity, etc., the electric charge is released via the switching element 12*a* to the spare wire 7*b*. In the case when electric charge appears on the spare wire 7*b*, the electric charge is released via the switching element 12*b* to the spare wire 7*a*. Therefore, even when high voltage is applied to one of the spare wires 7 due to static electricity, the protecting circuit 12 allows the electric charge to be released to the neighboring spare wire 7, and it is possible to prevent electric field from being concentrated on a certain spare wire 7.

In other words, with regard to a certain amount of electric charge appearing on the spare wire 7, the static electricity capacity which receives the electric charge increases proportionally to the number of the spare wires 7 connected by the protecting circuits 12; thus, the voltage of the electric charge can be effectively reduced.

Therefore, even in the case when the terminals 13, etc. of the spare wires 7 come into contact with an object which is charged with static electricity so that high voltage is applied to the spare wires 7 due to the static electricity, or even in the case when the panel is charged with static electricity which is discharged to an object when the terminals 13 of the spare wires 7 come into contact with the object so that a large difference appears between electric potentials of the entire panel and the spare wires 7 and a high voltage is applied to the spare wires 7, the protecting circuits 12 make it possible to prevent high voltage appearing at the intersections of the spare wires 7 and the signal lines 4 or the scanning lines 3 from causing puncture, and further to prevent a surge of electric potential from causing a degradation in property of the TFT elements 21.

The active-matrix substrate 1 is provided with the protecting circuits 11 between the spare wire 7 and the scanning line 3 and between the spare line 7 and the signal wire 4 as well as between the adjacent spare wires 7.

This arrangement is much more effective in preventing the puncture and other defects as compared with the case in which static electricity is received in accordance with the number of the disposed spare wires 7. Specifically, the number of the spare wires 7 is generally limited to a few more than ten; meanwhile, the number of the signal lines 4 or the scanning lines 3 ranges from several hundreds up to several thousands in accordance with the display area; thus, when all these lines are connected with the protecting circuits 10 through 12, the voltage can be reduced to from one several hundredths to one several thousandths with regard to the same amount of electric charge.

The protecting circuits 11 connects the spare wire 7 and the signal line 4 and connects the spare wire 7 and the scanning line 3 so that even when static electricity is applied to one of the spare wires 7, the electric charge is released to all the signal lines 4 and scanning lines 3 via the protecting circuits 11 with time; thus, no voltage is applied between the spare wire 7 and the signal line 4 and between the spare wire 7 and the scanning line 3. Therefore, it becomes possible to prevent defects caused by static electricity.

Here, the protecting circuits 12 are disposed between the adjacent spare wires 7 in the vicinity of the terminals 13; however, the protecting circuits 12 are also allowed to be disposed between the adjacent terminals 13. The protecting circuits 10 and 11 are also allowed to be arranged in the same manner.

Next, the following explanation describes a manufacturing method of the active-matrix substrate 1 and a manufacturing method of the liquid crystal display device in which the active-matrix substrate 1 is adopted.

On the insulating substrate 31, a metal layer is formed into a predetermined pattern by using a method such as a sputtering method. The metal layer is made into the scanning lines 3, the spare wires 7, the metal films 15a and 15b, and the gate electrode 26. And then, an insulating film is formed so as to serve as the gate insulating films 16 and 27. The following layers are successively formed into predetermined patterns by using a method such as the sputtering method: (1) a semiconductive layer which is made into semiconductive thin films 17 and 28, (2) n$^+$-silicon layer which is made into the source electrodes 18a and 29a and the drain electrodes 18b and 29b, and (3) a metal layer which is made into the signal lines 4, the metal layers 19a and 30a, and the metal layers 19b and 30b.

Further, on the signal lines 4, etc., a photosensitive acrylic resin is formed into the between-layer insulating film 32 with a thickness of 3 μm by using a spin applying method. The photosensitive acrylic resin is exposed in accordance with a predetermined pattern and is subjected to an alkaline solution so as to form the contact hole 24 which penetrates the between-layer insulating film 32.

Upon forming the between-layer insulating film 32, on the terminals 8 and 9 of the signal lines 4 and the scanning lines 3, the between-layer insulating film 32 is not formed so that it is possible to keep an electric contact via TAB with an external circuit; meanwhile, the between-layer insulating film 32 is disposed on the upper layer of the protecting circuits 10 through 12. The objective is to prevent leakage from occurring between the source and drain on the protecting circuits 10 through 12, and further to prevent a substance stuck to the wires from applying an unnecessary voltage between the diodes and giving an adverse effect on the display, after the external circuit has been installed and the display device has been achieved.

Furthermore, a transparent conductive film, which serves as the pixel electrode 22, is formed by using the sputtering method and is subjected to a patterning operation. The pixel electrode 22 is connected with the drain electrode 29b of the TFT element 21 via the contact hole 24 penetrating the between-line insulating film 32, and the metal layer 30b.

On the effective display area 6 of the active-matrix substrate 1 that is achieved in the above-mentioned process, a polyimide alignment film is formed and the aligning function is added thereon by performing a rubbing operation and so on. On the opposing substrate 2, after a transparent common electrode made of ITO, etc. has been formed into a film thereon, a part corresponding to an effective display area 6 is subjected to an aligning operation.

And then, on a peripheral part of the panel, a sealing member is applied in a manner so as to surround the panel except for an inlet for filling liquid crystal by using a method such as a printing method. And on the active-matrix substrate 1, a conductive material is bonded to the signal input terminals for opposing electrodes, spacers for keeping even the cell thickness of the liquid crystal layer are dispersed, the sealing member is bonded to the opposing substrate 2, and finally a heating operation is performed so as to harden the sealing member.

Afterwards, liquid crystal is filled from the inlet for filling liquid crystal and the inlet is sealed with a sealing member so as to achieve a liquid crystal panel of the liquid crystal display device. And a driver, a control circuit, and a backlight and other members are installed so as to achieve the liquid crystal display device.

Here, in the active-matrix substrate 1 of the present embodiment, each of the switching elements 12a and 12b constituting the protecting circuit 12 has a channel length L and a channel width W(shown in FIG. 5) of L=5 μm and W=50 μm. This arrangement is devised for the following reason. Note that, as shown in FIG. 5, the interval between the metal layers 19a and 19b corresponds to the channel length L, and the width of the semiconductive thin film 17 corresponds to the channel width W.

In order to determine the values of the channel length L and the channel width W, with regard to the conventional liquid crystal display device in which the protecting circuits are disposed merely between the signal lines and between the scanning lines, the signal wires are corrected by using the spare wires.

Firstly, in the vicinity of the input terminals of the signal lines, the signal lines are cut by using laser. And, in the normal process for the case in which defects are found on lines by inspection; namely, the spare wires respectively disposed on the input side and the non-input side of the signal lines are welded and connected with the disconnected signal line at the intersection by using laser. The spare wires disposed on the input side and the non-input side are respectively conducted by the external circuit so that between the non-input side and the disconnected portion, a signal applied from the terminal of the signal line is given from the opposite side of the panel, namely, from the opposite side of the input terminals of the signal lines, via the connected spare wires.

In this case, the input terminals of the spare wires are grounded via resistance in order to confirm a margin for leakage current related to the signal. As a result, the leakage current of not less than 1 MΩ causes no problem on the display as well as in a reliability test equivalent to 50,000 hours of practical use. However, it is confirmed that some corrected lines are visually observed when the leakage current is not more than 1 MΩ.

The protecting circuit 12 connects the adjacent wires with one wire so that it is necessary to set one resistance value at not less than 2 MΩ. Therefore, the protecting circuit 12 is arranged as follows: As shown in FIG. 4, in the protecting circuit 12, the gate electrode and the source electrode of the TFT are short-circuited so as to form the diode which has a forward direction from the gate/source side to the drain side. The construction unit of the protecting circuit 12 is constituted by the diodes which are connected in parallel in two directions. Even when any one of the spare wires 7a and 7b receives high electric potential, at least one of the diodes has a forward direction so as to release electric charge to the other.

Figure 7:
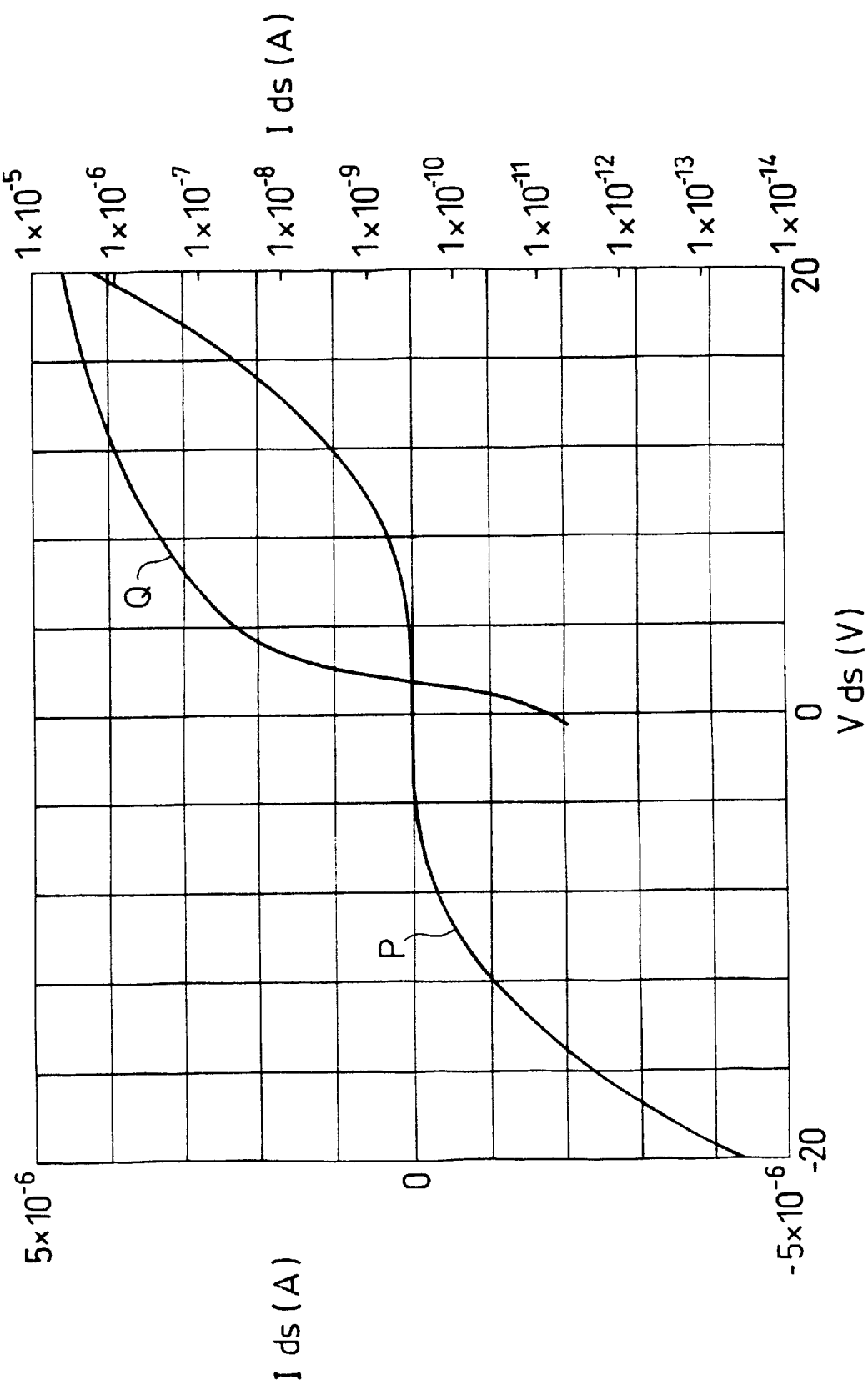
FIG. 7 is a graph showing an electric property of the protecting circuit having a diode ring structure.

FIG. 7 is a graph showing an electric property of a protecting circuit having the above-mentioned diode ring structure, and showing current in accordance with voltage applied between the adjacent wires in a linear scale and a log scale. A curve P corresponds to the linear scale of the left axis and shows the property of current Ids—voltage Vds of the protecting circuit in the linear scale of −5 μA~5 μA. The curve Q corresponds to the log scale of the right axis and shows the property of the current Ids—voltage Vds of the protecting circuit in the log scale of −10$^{-14}$A~10$^{-5}$A. As mentioned above, the log display by using the curve Q makes it possible to read the current value of the area(−5V<Vds<5V) which overlaps an axis of 0A in the linear display. However, the log display does not show a current value with regard to a voltage value of not more than 0.

As shown in FIG. 7, the protecting circuit is a nonlinear element whose resistance value considerably decreases as the applied voltage increases; namely, the resistance value and the voltage are symmetrical on the positive side and the negative side.

Note that, the property shown in FIG. 7 is a measured value on the assumption of W=15 μm, L=5 μm, SiNx (dielectric constant of 6.9) serving as the gate insulating film with a thickness of 3440 Å, and an anodic oxidation film (dielectric constant of 24) made of Ta with a thickness of 1500 Å for forming the gate wire. On the assumption that the mobility of electric charge of amorphous silicon is 0.35 cm$^2$/VS and the threshold voltage is 1V, this property virtually corresponds to the following equation in the area of not less than a voltage of Vds 10V in a protecting circuit. The equation is a general approximate equation of current in a saturated area of a MOS transistor.

$$Id = \frac{1}{2}\mu c(W/L)(Vg-Vth)^2$$

According to the above-mentioned equation, for example, normally, in order to realize the above-mentioned resistance value of not less than 2 MΩ for the maximum voltage value of 4V between the spare wires 7, it is desirable to set W/L at not more than 80. However, in an actual arrangement, it is necessary to set the W/L smaller for the following reason:

Namely, in the case of the amorphous silicon, unlike mono-crystalline Si, the density of defects is high in the film, and a drift effect becomes dominant upon applying high voltage so that the property readily tends to correspond to a theory equation; meanwhile, in a weak electric field, it becomes impossible to ignore the influence of an acquisition due to a diffusion and a trap level, and leakage current. Thus, the property cannot readily correspond to the theory. In fact, as shown in the property of FIG. 7, the resistance value at 4V is 100 MΩ. When a calculation is carried out in accordance with the relationship between the resistance value and the W/L, the resistance value of not less than 2 MΩ requires the W/L of not more than 150, which is quite different from the calculated value. Such a difference in the numerical value may be above 0 or below 0 due to unevenness of products. It is virtually impossible to strictly control the density of defects in the semiconductive layer in order to reduce the unevenness of the products.

Moreover, in view of unevenness of the thickness and the dielectric constant of the insulating film, the threshold value, and the mobility of electric charge of amorphous silicon, it is more desirable to inductively determine the arrangement of the protecting circuit 12 based on the measured value rather than based on the theoretical value.

Therefore, when some of practically manufactured products are picked up at random and their properties are measured, it is understood that a diode arranged with W/L=3 has an unevenness of 20 nA~200 n upon applying voltage of 4V; namely, the resistance value ranges from 20 MΩ to 200 MΩ. In other words, it is desirable to set the W/L at not more than 30 in order to achieve the resistance value of not less than 2 MΩ regardless of a degree of the unevenness in the production process.

The above-mentioned construction can be arranged as described above; however, for the different arrangement, it is quite necessary to set a different value for the protecting circuit 12. For example, in the case of a construction in which anodization is not performed due to a change in materials of the gate and a change in the process, if the SiNx film thickness is not changed, the capacitance of the gate insulating film grows so as to increase the current value; accordingly, it is necessary to set the W/L at not more than 27 which is 0.89 times larger than the original value. In the case when the protecting circuits 12 are respectively arranged on the side of scanning lines and the side of signal lines, and anodization is performed on the side of scanning lines; meanwhile, it is difficult to structurally anodize the side of the signal lines, it is necessary to carefully arrange the construction.

Furthermore, in the case when the mobility of the semiconductive layer and the threshold value of the diode are different in addition to the capacity and the film thickness of the insulating film, it is quite necessary to change the arrangement of the W/L.

For example, in the case when, instead of the amorphous silicon, polycrystal silicon with n-channel is used as a semiconductive layer, the mobility increases by approximately 500 times; thus, it is necessary to set the W/L of the protecting circuit 12 at approximately 1/500 as compared with the case of the amorphous. In the case of single crystal silicon which may be used as a light bulb for projection, the W/L of the protecting circuit 12 is set at approximately 1/2000 as compared with the case of the amorphous.

In the latter case, the W/L is set at 0.015. Unlike the case of the amorphous, in the process, it is difficult to determine the W/L by changing the channel width W while maintaining the channel length L at 5 μm. Therefore, in this case, a method in which, for example, W is set at 3 μm and L is set at 200 μm, can be adopted. The current value of the diode is related to the ratio of W and L; thus, whichever W or L is adjusted so as to realize the above-mentioned W/L, a substantial change cannot be found.

Therefore, for example, in the case when it is necessary to set L at 200 μm as in the case of the single crystal silicon, the channel needs to be formed so as to meander due to insufficient intervals between the terminals. Generally, it is desirable to place the first priority on realizing an arrangement which allows defects to appear at the least likely possibility in the process, and then, each of the W and L is determined so as to satisfy the predetermined W/L ratio.

For example, as described above, in the case of the present embodiment in which the amorphous silicon is used, the arrangement of L=5 μm and W=50 μm is adopted. For a reason that a gap between the metal films, that determines the channel length L, is 5 μm so that defects caused by short circuits readily occur, or for other reasons, the arrangement of L=10 μm and W=100 μm can be also adopted in order to achieve the same effect.

However, in the production process of the liquid crystal display device, the process is generally controlled so as not to cause a problem by forming a gap of 5 μm. Contrary to that, if W becomes too large, the rate of defects becomes greater due to the enlargement of the diode. Thus, it is possible to set W at not more than 200 μm. This assumption is based on the following calculation:

Upon examining a panel manufactured nowadays, in a 15-type XGA panel, a total distance between the pixel and the signal lines is approximately 1400 m with a gap being approximately 5 μm. The largest number of dot defects, which is caused by a conductive foreign substance and a remained pattern, is approximately 10 for each panel. Namely, when a non-defective panel is produced in a normal manufacturing process, one defect appears for each channel width of 140 m.

Incidentally, between the signal lines and between the scanning lines of the same panel, pairs of the diodes with L=5 μm and W=200 μm are respectively arranged in two directions as the protecting circuits. It is desirable that the protecting circuit disposed between the spare lines have the same construction as that of the diode disposed between the adjacent signal lines and between the adjacent scanning lines in order to allow electric charge to be equally released to another line when any one of lines is subjected to static electricity, and in order to prevent the amount of charged electricity between the lines from being uneven for each protecting circuit upon applying electricity; thus, the channel width W is set at 200 μm.

And then, the total of the channel widths W of these diodes is 200 μm×(1024×3+768+the number of the spare wires)×2=(1536+ ) mm. It is understood that approximately 0.01 defect appears on lines of the protecting circuit for each panel. Namely, a reduction in non-defective products is approximately 1% with regard to manufactured panels. This is a guideline in arranging kinds of products and is a reason why the diode in the protecting circuit 12 is desirably arranged to have the channel width W of not more than 200 μm in order to prevent the reduction in non-defective products from exceeding 1%.

Naturally, in the case when a rate of defective products decreases due to improvement in a dust condition and production technology of the process, or in the case when some kinds of the panel have different numbers of the signal lines and/or the scanning lines, the following arrangement is also adopted: after consideration of variety of factors including a predetermined rate of non-defective products, a cost arrangement, and resistance against static electricity, if it is determined that it is favorable to place a higher priority on preventing static electricity from causing destruction than decreasing a risk of defective diodes, it is possible to set W larger as long as the resistance value is not less than 2 MΩ.

Further, when a defect appears on the protecting circuit 12, it is desirable, for example, to constrict the predetermined portion which is to be cut by laser; thus, it is possible to cut between the protecting circuit 12 and the spare wire 7 by laser if necessary.

Contrary to that, with regard to defects appearing in the process, it is possible to arrange the larger channel length L as long as the channel length L is not formed in an exceptional arrangement including the meandering pattern; however, it is not desirable to arrange the smaller channel length L because the smaller channel length L directly causes an increase in a rate of defective products. Specifically, in the case when the channel length L is produced on a glass substrate in accordance with a normal production flow of the liquid crystal panel, the channel length L needs to be at least not less than 3 μm.

As described above, it is possible to determined the lowest limit of the resistance value of the protecting circuit 12; however, it is difficult to determined the upper limit value. This is because it is favorable to set the resistance value of the protecting circuit 12 as low as possible in order to prevent defects caused by static electricity, and an optimum value cannot be specified. In this sense, it is the most proper to set the resistance value at the lowest limit.

With regard to the resistance value of the protecting circuit 12 upon applying static electricity, it is virtually impossible to specify the resistance value for the following reasons: since static electricity is applied under a wide variety of conditions, it is not possible to specify the applied voltage value when a destruction mechanism of static electricity is analyzed for considering a measure; meanwhile, the diode consisting of the protecting circuit 12 is a nonlinear element whose resistance value varies in accordance with the voltage, moreover, the voltage of the static electricity is sufficiently high to change the electric property of the semiconductor of the diode disposed in the protecting circuit 12, and the total time period of applying this high voltage and the total amount of electric charge change in a variety of ways depending upon the environment in which the static electricity appears, furthermore, the diode property changes with time upon applying high electric field, and a degree of degradation in the diode cannot be readily estimated.

Therefore, it is merely possible to specify one voltage and arrange the shape of the diode, on the assumption that the aforementioned general equation of the diode is established when static electricity appears. And then, it is understood that the diode whose resistance value is 10 MΩ upon applying 100V has W/L=0.4. Thus, with regard to the resistance value of the diode when the voltage is 4V, the diode is arranged so as to have the resistance value ranging from 2 MΩ to 400 MΩ.

Additionally, the 10 MΩ upon applying the voltage of 100V is a value which is experimentally obtained based on a fact in which: when several kinds of voltages which are not less than 50V are charged in a condenser having not less than 100 pF, and the spare wires which connect high resistance between the adjacent wires are discharged, no effect for preventing destruction caused by static electricity can be given on the wires connected with the resistance of not less than 10 MΩ.

Naturally, when the resistance value becomes smaller, the possibility of destruction caused by static electricity is reduced; thus, any Ω is not always accepted even if the resistance value is not more than 10 MΩ. To the contrary, in the case when it is desirable to discharge voltage of 30V even at a slow pace(in the case when the objective is to prevent a direct current applied to the liquid crystal for a long time from reducing reliability), the resistance value Hidoes not always need to be not more than 10 MΩ. In some cases, the same effect can be obtained with the resistance value of more than 10 MΩ.

Further, in the present embodiment, the diode is used upon forming the protecting circuit 12; thus, the resistance value is regulated to range from 2 MΩ to 400 MΩ when voltage of 4V is applied. For example, in the case when the protecting circuit 12 is formed by using a linear element such as a single layer of n+layer, the resistance value can be within the range from 2 MΩ to 10 MΩ regardless of the amount of voltage. Even in the case of a non-linear element, due to a voltage and current property, the upper limit of the resistance value is not less than 2 MΩ; however, the upper limit value may be different from the above-mentioned case upon applying the voltage of 4V.

In the active-matrix substrate 1 of the present embodiment, the W/L of the protecting circuit 12 disposed between the spare wires 7 is set at W/L=50/5 as described above. Furthermore, the protecting circuit 10 disposed between the signal line 4 and the scanning line 3 is arranged to have W/L=50/5 , and the protecting circuit 11 disposed between the spare wire 7 and the scanning line 3 is arranged to have W/L=15/5 . The respective protecting circuits have different values because the voltage applied to the protecting circuits 10 through 12 varies in a normal operation. The protecting circuits 10 and 12 are normally applied voltage at a maximum of 4V, and the protecting circuit 11 is normally applied voltage at a maximum of 14V. Additionally, based on the calculation, it is found that the W/L needs to be not more than 14 in order to set the resistance value at 2 MΩ upon applying the voltage of 14V; thus, the protecting circuit 11 is allowed to have the same W/L as those of the other circuits. Here, the W/L of the protecting circuit 11 is arranged so as to increase a margin for the event of a change in a property of the diode.

A trial liquid crystal display device, in which the active-matrix substrate 1 of the present embodiment is used, is manufactured and evaluated. As a result, no problem is found with regard to confirmation of operation as well as reliability.

Additionally, upon manufacturing the liquid crystal display device, members are disposed so as to shield light on the protecting circuits 10 through 12. This arrangement prevents light shedding on the semiconductive layers consisting of the protecting circuits 10 through 12 from causing a pair of an electron and a hole. The pair of an electron and a hole increases leakage of current which allows the resistance value to be different from the predetermined value. At the same time, this arrangement also prevents light energy from accelerating a degradation of the semiconductive layers.

The liquid crystal display device, which is manufactured by using the active-matrix substrate 1 having the protecting circuits 12 between the spare wires 7 as well as between the scanning lines 3 and between the signal lines 4, has a strong resistance against static electricity. As compared with the conventional liquid crystal display device which is manufactured in the same process and which causes 2% defective products due to static electricity, the rate of defective products is no more than 0.3% with regard to the liquid crystal display device using the active-matrix substrate 1.

[EMBODIMENT 2]

Figure 8:
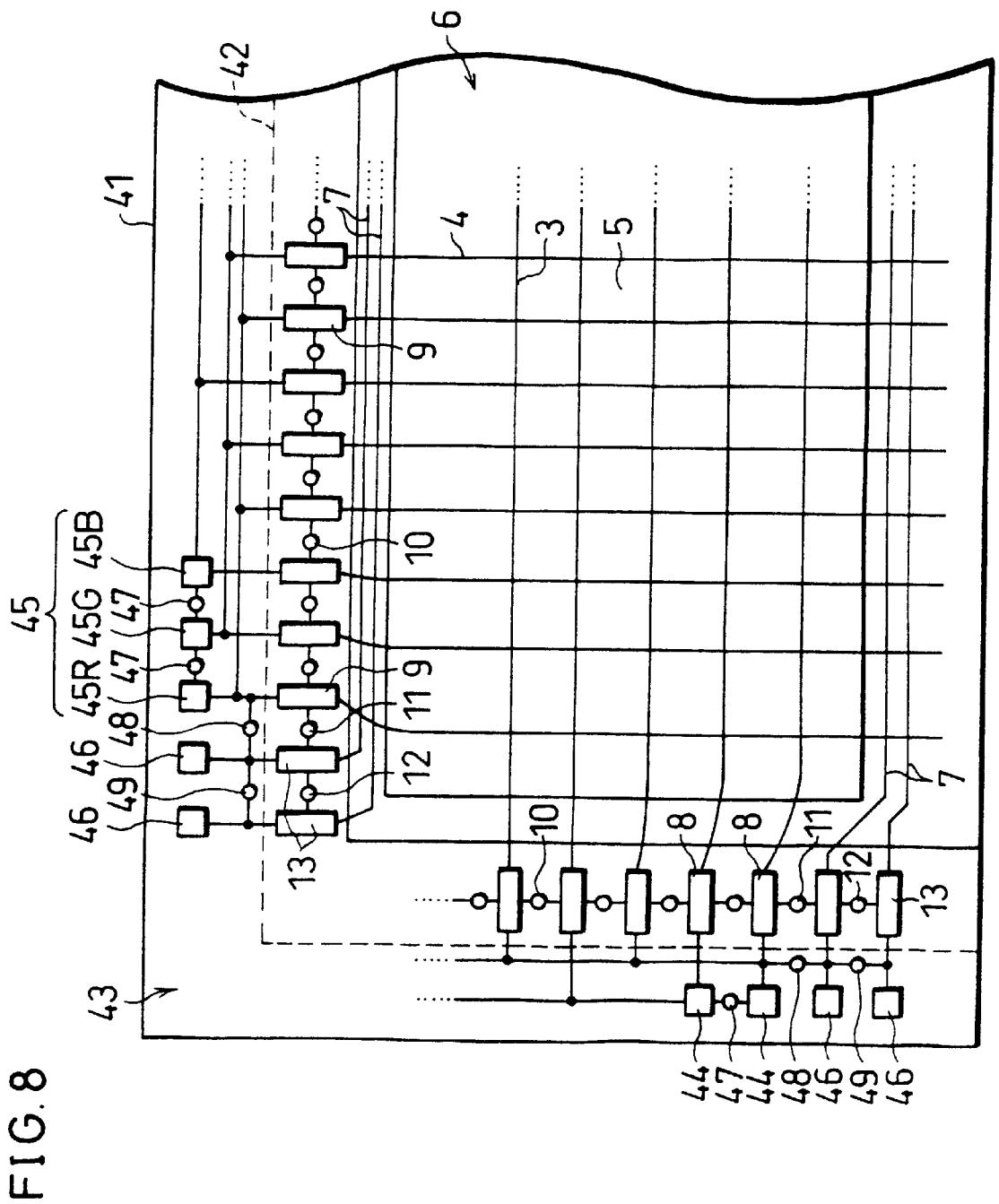
FIG. 8 is a plan view schematically showing a construction of an active-matrix substrate in accordance with another embodiment of the present invention.
Figure 9:
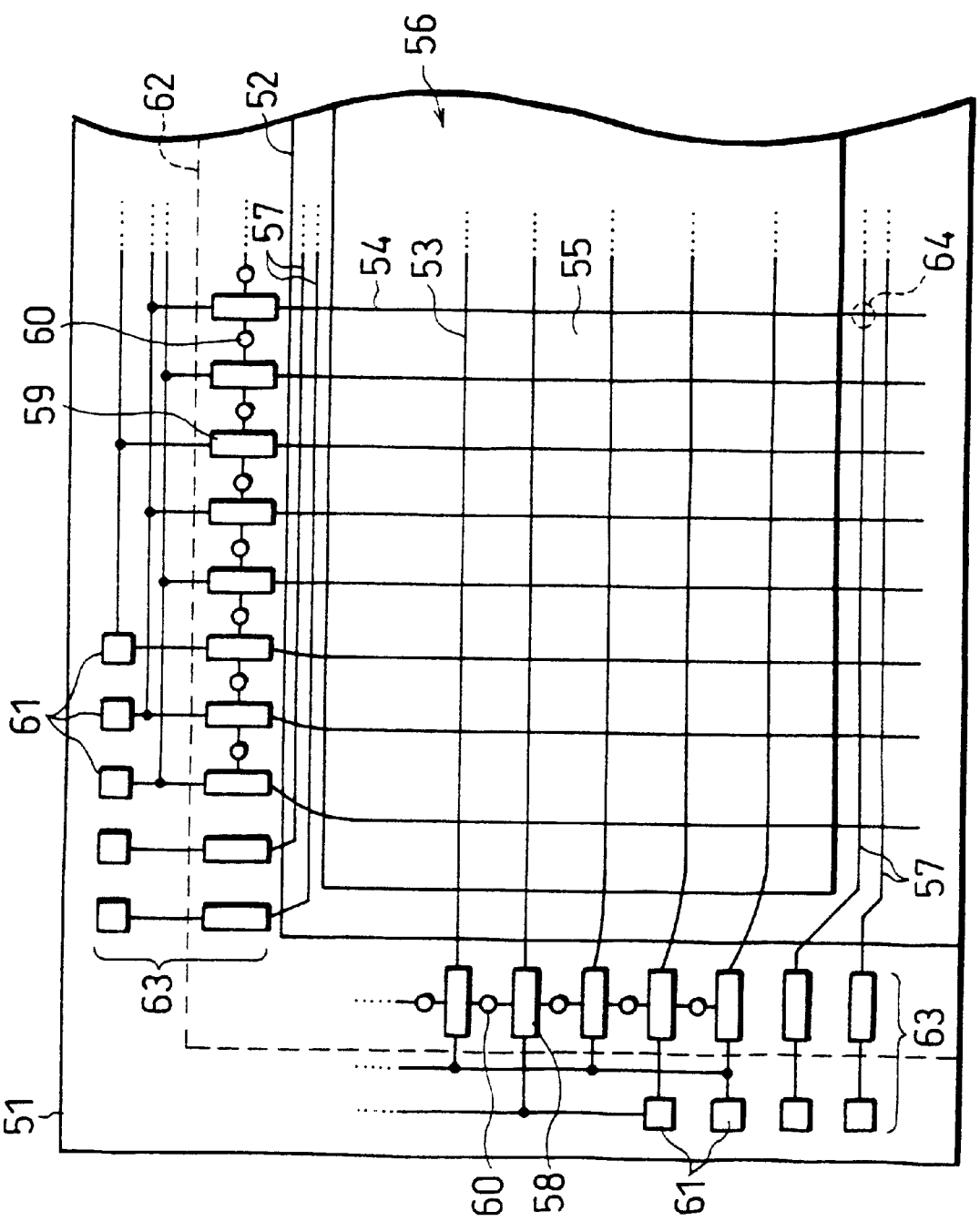
FIG. 9 is a plan view schematically showing a construction of a conventional active-matrix substrate.
Figure 10:
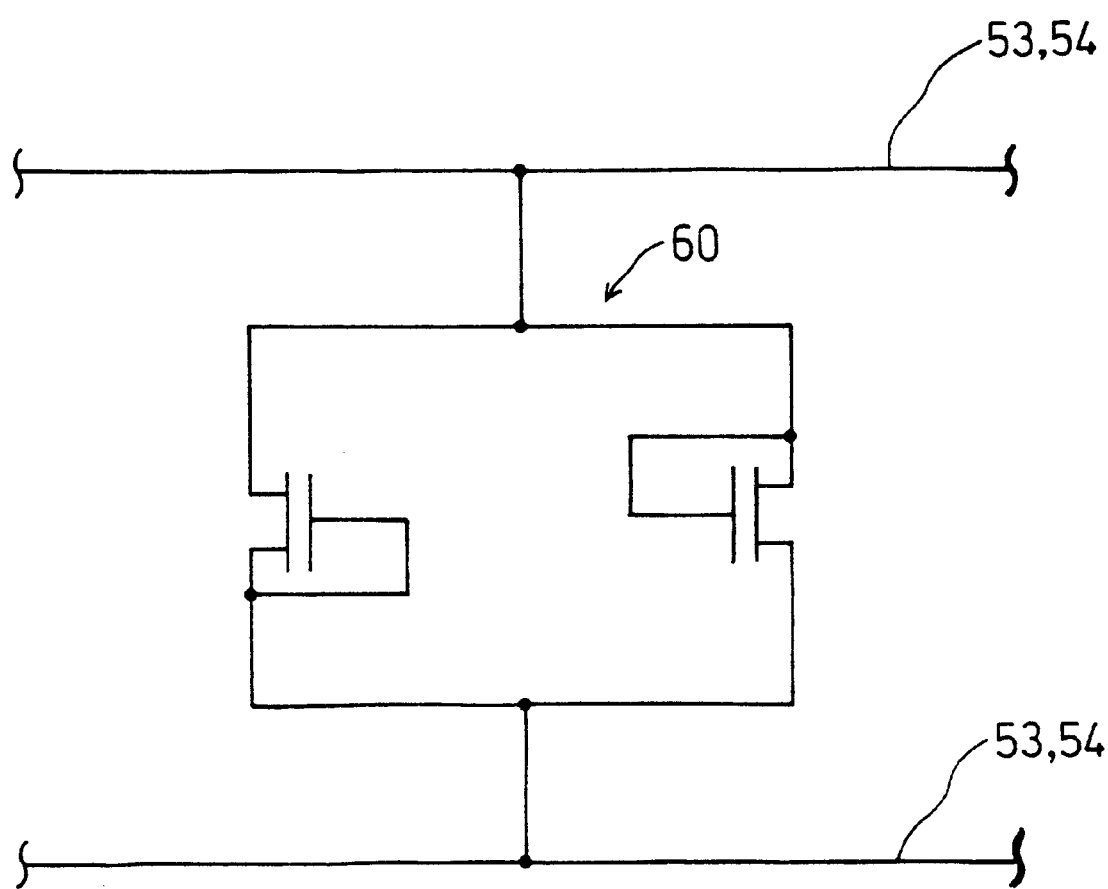
FIG. 10 is a circuit diagram showing a protecting circuit disposed in the conventional active-matrix substrate.

Referring to FIG. 8, the following explanation describes another embodiment of the present invention.

Additionally, for convenience, members having the same functions as those indicated in Figures of the First Embodiment are given the same reference numerals and explanations thereof are omitted.

As shown in FIG. 8, an active-matrix substrate 41 of the present embodiment is provided with an area 43 which is removed from the active-matrix substrate 41 by cutting the active-matrix substrate 41 on a division line 42 upon completion of the lighting inspection. Except for this arrangement, the active-matrix substrate 41 has the same construction as an active-matrix substrate 1.

Further, the active-matrix substrate 41 has terminals 8, 9, and 13 which are respectively provided with a plurality of terminals 44, 45, and 46 for the lighting inspection. The terminals 44, 45, and 46 are disposed in the area 43 which is provided for mounting external circuits outside the terminals 8, 9, and 13. In order to carry out the lighting inspection more easily, a plurality of scanning lines 3 are electrically bundled and connected with each of the terminals 44 by using a short-circuit wiring. The terminal 45 is, for example, constituted by a plurality of terminals 45R, 45G, and 45B corresponding to each colors of red(R), green(G), and blue(B) so as to carry out the lighting inspection more easily. A plurality of signal lines 4 for R. G. and B are electrically bundled and are respectively connected with the terminals 45R, 45G, and 45B by using the short-circuit wiring. Meanwhile, each of the terminals 46 is connected with a corresponding terminal 13 of a spare wire 7.

Furthermore, in the same manner as the active-matrix substrate 1, the active-matrix substrate 41 is provided with protecting circuits 10 through 12, and protecting circuits 47 through 49 in the external area 43. The protecting circuits 47 are provided between the adjacent terminals 44 and 45 on the area 43 so as to connect the scanning lines 3 and to connect the signal lines 4. The protecting circuits 49 are provided between the adjacent terminals 46 on the area 43 so as to connect the adjacent spare wires 7. The protecting circuits 48 are provided between the terminal 44 and the terminal 46 and between the terminal 45 and the terminal 46 so as to connect the spare wire 7 and the scanning line 3 and to connect the spare wire 7 and the signal line 4.

Here, as described above, the protecting circuits 49 disposed between the spare wires 7 are cut off upon completion of the lighting inspection so that this arrangement is free from a restriction that the resistance value needs to be not less than 2 MΩ. Therefore, the protecting circuits 49 are allowed to have wider channel widths in order to increase the resistance against static electricity. The same arrangement is adopted in the protecting circuits 48 as well. In the active-matrix substrate 41, the channel widths and the channel lengths of the protecting circuits 48 and 49 are respectively set at 2500 μm and 5 μm.

A liquid crystal panel is manufactured by using the active-matrix substrate 41 and the lighting inspection is carried out as follows:

As described above, short-circuit wires are provided outside the terminals 9 of the signal lines 4 so as to bundle the signal lines 4 corresponding to red, green, and blue. Signals are respectively inputted to the terminals 45R, 45G, and 45B which are connected with the bundled wires so as to provide a display of each of the colors upon inspecting the operation.

Here, when a defect is found on a certain signal line 4 or scanning line 3, as described above, a correction is performed by connecting the two spare wires 7 with the disconnected line by using laser. Afterwards, it is necessary to electrically inspect whether the breaking line is connected with sufficiently low resistance or not; thus, loop resistance between the two spare wires 7 is measured via the portion connected with laser. Therefore, if the resistance value via the protecting circuits 48 and 49 is not sufficiently larger than the loop resistance, a correct connecting resistance cannot be obtained.

Generally, when the connection is successfully performed, the resistance of the portion connected with laser can be regarded smaller by not less than two digits as compared with the resistance value of one spare wire; therefore, if the loop resistance is the same as the resistance value of the two spare wires connected in series, the connection is recognized to be successful. Thus, the resistance of the protecting circuits 48 and 49 is acceptable if it is larger than the resistance value of the two spare wires by one digit. The resistance of the protecting circuits 48 and 49 is equivalent to 20 times the resistance value of one spare wire. Therefore, in the present embodiment, the channel widths and the channel lengths of diodes, which constitute the protecting circuits 48 and 49, are respectively set at 2500 μm and 5 μm.

Naturally, if the substrate is mounted on the panel with the protecting circuits 48 and 49 being installed, the resistance value between the spare wires 7 is no more than 120 kΩ at a minimum upon applying voltage of 4V; thus, some problems occur on the display. However, as described above, the inputting protecting circuits 48 and 49 as well as common lines for inputting a simple inspection signal are removed together with glass; therefore, the arrangement of the panel in the actual mounting is the same as that of the first Embodiment, thereby causing no difficulty.

As described above, in the active-matrix substrate 41, the W/L of the protecting circuits 48 and 49 is set at W/L=500, and the upper limit value is 3000, which is found as follows:

The W/L of the conventional protecting circuit is 3, and the static property is shown in FIG. 7. When the voltage, which is shown by the horizontal axis of the graph, is around 0V, the current is an extremely slight signal which is called a subthreshold current and is greatly affected by the crystallizing state or the density of defects of the semiconductive layer; thus, it is generally difficult to suitably obtain an approximate equation of this area.

Therefore, in order to inspect the detail of the current of approximately 0V in the diode, the accumulated data, which have been collected from the past on the static property of the transistor, are reexamined. The diode is arranged based on the transistor. Now, it is understood that the subthreshold current ranges from 1 pA to no more than 100 pA at a maximum in the vicinity of 0V, in accordance with an amount of a gate threshold voltage.

Meanwhile, the resistance of the spare wire 7 is set at not more than 2 kΩ so as to keep an impedance to a minimum between the corrected line and a normal line; thus, the desired resistance value is not less than 40 kΩ for the protecting circuits 48 and 49.

Here, the W/L, which allows the resistance of the protecting circuits 48 and 49 to be 40 kΩ, is found. On the assumption that the current value provided from a constant power source of a tester is 1 μA upon measuring, the loop resistance, which is appropriately corrected, is approximately 4 kΩ. Thus, a voltage applied between the terminals is not more than 4 mV. When the corrected portion is not connected, the applied voltage is determined by the product of the resistance value of the protecting circuits 48 and 49 and the constant current source(1 μA in this case) Namely, when the diode is arranged so as to allow the resistance to be set at 40 kΩ, which is the minimum resistance value for measuring the loop resistance, it is understood that the applied voltage is 40 mV.

On the assumption that the subthreshold current of the W/L=3 diode is at 100 pA, which is the maximum value, the current increase by one digit allows the current value to be 1 nA and the resistance to be 40 MΩ. Therefore, when the W/L of the diode, that allows the resistance value to be 40 kΩ, is calculated back, it is understood that the value of the W/L needs to be not more than 3000, which is 1000 times as many as W/L=3.

As described above, it is concluded that the W/L of the protecting circuits 48 and 49 should be set at not more than 3000. As described in the explanation on the first Embodiment, in the case of a change in the construction of the diode, the film thickness of the insulating film, and the electric property of the semiconductive layer, the constructions of the protecting circuits 48 and 49 naturally need to be changed. For example, in the case when a low-temperature polycrystal silicon, which has been currently developed, is used so as to constitute a diode, it should be noted that the leakage current of the subthreshold area may increase by two digits.

As described above, the lower limit of the resistance value of the protecting circuits 48 and 49 is determined; however, it is difficult to specify the upper limit value as described in the first embodiment. As the resistance value increases, the effect of the protecting circuits 48 and 49 is decreased. Here, one of the objectives of the construction of the present embodiment is to increase the effect of the first Embodiment; therefore, it is naturally desirable to set the upper limit value smaller than the resistance values of the protecting circuits 11 and 12, which are not cut off after the inspection.

Further, the effect obtained by omitting an anodic oxidation on the gate is described in the first Embodiment. In the present embodiment, even if the density of SiNx defects is high, the defects on the protecting circuits 47 through 49 do not remain on the display device when the products are shipped. The protecting circuits 47 through 49 are disposed on the area 43 which is cut off after the inspection. Therefore, the difficulties diminish with regard to the appearance of the defects. Additionally, in order to realize a protecting circuit which is greatly effective with a smaller area, with regard merely to the protecting circuits 47 through 49 on the area 43 which are cut off after the inspection, it is favorable to adopt the construction which does not use the anodic oxidation on the gate so as to reduce the resistance value.

Now, as shown in the aforementioned calculations, since the diode is a non-linear element, during the lighting inspection, it is necessary to pay attention to the applied voltage upon measuring in order to obtain the appropriate resistance value.

Usually, for a commercial tester for measuring a slight current, the following method is adopted in many cases: a constant current is applied to an element and a voltage is measured on both ends so as to obtain the resistance. Therefore, in the present embodiment as well, the constant current receives attention upon controlling the applied voltage. With regard to the diode with W/L=3000, as described above, the current is set at not more than 1 μA so as to set the voltage at not more than 40 mV; consequently, the resistance value of 40 kΩ can be obtained. Therefore, it is possible to find the correct connecting resistance for the spare wires. In the present embodiment, the W/L is 500. Upon measuring with the current of 1 μA in the same manner as that of the above-mentioned diode, it is possible to obtain a favorable result: not less than 1 MΩ for a loop in which the spare wires are not corrected, and 3 kΩ~4 kΩ for a loop in which the spare wires are corrected.

The measured current is not particularly limited to 1 μA. It is possible to select one of any current values such as 100 nA and 10 nA in accordance with a tester range for measuring as long as the current value is not more than 1 μA. However, note that the protecting circuits 48 and 49 should not be subjected to external light upon measuring the resistance because the diode is a semiconductor element which dramatically increases the current in response to light entering the semiconductive layer.

Furthermore, in the present embodiment, there are concerns about securing a margin for the external incident light, an area for mounting the protecting circuits 48 and 49, and the possibility of a reduction in a yield when the channel width is too large; thus, the W/L is set at 500. However, naturally, as long as the W/L is not more than 3000, increasing the W/L is more effective against static electricity.

Moreover, in order to prevent defects on the protecting circuits 48 and 49 from hampering the inspection on the panel, it is desirable to have a construction in which the protecting circuits 48 and 49 are disposed away from the spare wires 7 so as to be cut off by laser, etc. at any moment, and for example, constricted portions are formed between the protecting circuits 48 and 49 and the spare wires 7 so as to be cut off more easily. This arrangement can be adopted for the protecting circuits 11 and 12 as well.

The liquid crystal panel which is manufactured by using the above-mentioned active-matrix substrate 41 makes it possible to dramatically reduce the rate of defects which are caused by static electricity before the short-circuit lines of the signal lines 4 and the scanning lines 3 have been cut in the production line and the inspection line. The rate of defects is reduced to not more than 1/100 as compared with the conventional liquid crystal panel which is manufactured in the same line.

Additionally, a static electricity destruction test, in which after the entire panel has been charged, the spare wires 7 are grounded, also proves that the conventional product causes puncture at the intersections of the spare wires 7 and the signal wires 4 when the voltage is 1 kV; meanwhile, the present embodiment causes no puncture even when the voltage is 5 kV.

As described above, an active-matrix substrate of the present invention, which has, on the substrate, a plurality of scanning lines disposed in parallel, a plurality of signal lines disposed in parallel so as to intersect the scanning lines, and a plurality of spare wires disposed so as to intersect the signal lines and/or the scanning lines on the input sides and the non-input sides of the signal lines and/or the scanning lines, is characterized by a first protecting circuit for connecting the adjacent spare wires in order to protect the substrate from undesirable application of high voltage.

With the above-mentioned arrangement, (a) in the case when one of the spare wires comes into contact with an object which is electrostatically charged, or (b) in the case when, in a state in which the panel is charged, one of the spare wires comes into contact with an object which is grounded, or an object which has a large capacity, the first protecting circuit allows the electric charge to be released to the neighboring spare wire so that it is possible to prevent electric field from being concentrated on a certain spare wire. This effect is realized by the following function: relative to a certain amount of electric charge, the capacitance is increased in accordance with the number of spare wires connected with the first protecting circuits so that the voltage caused by the electric charge is effectively reduced.

Therefore, it is possible to prevent puncture from occurring at the intersections of the spare wires and the signal lines or the scanning lines, and to prevent degradation in property of the TFT elements that is caused by a surge of the potential.

Further, it is preferable to set the resistance value of the first protecting circuit at between 2 MΩ and 400 MΩ in the active-matrix substrate.

With the above-mentioned arrangement, the resistance value of the first protecting circuit is set within the above-mentioned range so that electric charge is released to another spare wire and a displaying operation is performed without causing any problems in a use for a display device. Therefore, it is possible to positively prevent the puncture and degradation in property of the TFT elements, and reliability is ensured for the device in a use for a display device.

For instance, static electricity, which is applied to one of the spare wires, is discharged to the neighboring spare wire in accordance with a time constant which is determined by the capacitance of the spare wire and the resistance value of the first protecting circuit. In this case, it is significant to discharge the static electricity as soon as possible and to shorten the duration of the applying high voltage to a minimum. For this reason, it is desirable to set the resistance value of the first protecting circuit to a minimum.

Meanwhile, in order to allow the liquid crystal display device to positively provide a display and to ensure reliability without any problems, the present invention determines the lower limit of the resistance value between the spare wires as well as between the signal lines and between the scanning lines. And in view of this arrangement, the resistance value of the first protecting circuit is set within the above-mentioned range.

Furthermore, it is desirable that the active-matrix substrate be provided with second protecting circuits for connecting between the adjacent scanning lines and/or between the adjacent signal lines, and third protecting circuits for connecting the spare wire and the scanning line and/or for connecting the spare wire and the signal wire.

With the above-mentioned arrangement, as compared with the case in which static electricity is received in accordance with the number of the disposed spare wires, it is possible to further prevent puncture occurring at the intersections of the spare wires and the signal lines or the scanning lines and to prevent degradation in property of the TFT elements that is caused by a surge of the potential.

This is because the number of the spare wires is generally limited merely to a few more than ten; meanwhile, the number of the signal lines and the scanning lines is arranged so as to be several hundreds to several thousands in accordance with the display capacity. Thus, when all these lines are connected with the first through third protecting circuits, the voltage is reduced to from one several hundredths to one several thousandths with regard to the same amount of electric charge.

Furthermore, the spare wires and the signal lines and/or the scanning lines are connected via the third protecting circuits so that with regard to any one of the spare wires, applied static electricity is released to all the signal lines and/or the scanning lines via the second protecting circuits and the third protecting circuits with time; therefore, voltage is not applied between the spare wires and the signal lines and/or between the spare wires and the scanning lines. For this reason, it is possible to positively prevent defects caused by static electricity.

Moreover, in the active-matrix substrate, it is desirable that the first through third protecting circuits be provided with two diode-type semiconductor elements which are parallel-connected in the opposite direction from each other.

With the above-mentioned arrangement, the first through third protecting circuits have diode ring structures. With regard to any one of the adjacent spare wires, the first protecting circuit allows applied static electricity to be released to another spare wire.

Additionally, in the case when the first through third protecting circuits are arranged as described above, it is possible to form the diode-type semiconductor elements by making use of a process for forming the TFT elements on the substrate; consequently, it is possible to prevent an increase in the number of the steps.

Further, in the active-matrix substrate, it is preferable to set a ratio of a channel width to a channel length at between 0.4 and 30 with regard to the diode-type semiconductor element in the first protecting circuit.

With the above-mentioned arrangement, with regard to the diode-type semiconductor element, the ratio of the channel width to the channel length is set within the above-mentioned range in order to release electric charge to another spare wire and in order to provide a display without any problems in a use for a display device. Therefore, it is possible to positively prevent the puncture and degradation in property of the TFT elements, and the reliability of the device is ensured in a use for a display device.

Furthermore, in the active-matrix substrate, it is desirable that in the first protecting circuit, the channel width be set at not more than 200 μm and the channel length be set at not less than 3 μm with regard to the diode-type semiconductor element.

With the above-mentioned arrangement, the channel width and the channel length are set within the above-mentioned range with regard to the diode-type semiconductor element so that it is possible to release electric charge to another spare wire and to provide a display without any problems in a use for a display device.

Moreover, in the active-matrix substrate, with regard to the third protecting circuit which connects the spare wire and the scanning line, it is desirable to set the smaller ratio of the channel width to the channel length of the diode-type semiconductor element as compared with those of other protecting circuits.

With the above-mentioned arrangement, in a use for a display device, the ratio of the channel width to the channel length is set low in accordance with voltage applied in a displaying operation of the third protecting circuit; therefore, the reliability of the device can be further increased.

The active-matrix substrate is allowed to be provided with terminals which are connected with the scanning lines for inspecting the operation, terminals which are connected with the signal lines for inspecting the operation, terminals which are connected with the spare wires for inspecting the operation, and the fourth protecting circuits which connect the adjacent spare wires, in an area which is to be cut off upon completion of the lighting inspection.

The above-mentioned arrangement is provided with the fourth protecting circuits; therefore, it is possible to prevent puncture from occurring at the intersections of the spare wires and the signal lines or the scanning lines, and to prevent degradation in property of the TFT elements that is caused by a surge of the potential.

In the case when defects are found on lines in the lighting inspection, it is necessary to electrically inspect whether the spare wires are connected with the signal lines or the scanning lines by laser with sufficiently low resistance. Thus, it is not possible to leave a short circuit in a plurality of the spare wires or between the spare wires and the signal lines or the scanning lines. Therefore, the conventional arrangement has the spare wires which are electrically independent from each other, thereby offering less protection against static electricity than the signal lines and the scanning lines.

Since the above-mentioned arrangement is provided with the fourth protecting circuits, the spare wires are effectively protected from static electricity in a more positive manner. Further, since the fourth protecting circuits are disposed in an area which is to be cut off upon completion of the lighting inspection, the protecting circuits have been cut off when a displaying operation is performed. Therefore, this arrangement is free from the restraint in which the resistance value needs to be not less than 2 MΩ. Namely, the fourth protecting circuit merely needs to satisfy a condition in which the resistance is sufficiently high for determining whether the resistance is sufficiently low or not at the connected portions, upon correcting the above-mentioned defects on lines by using laser. And high reliability is not required. Thus, any problems are not caused even when a large channel width is arranged in order to release a large amount of static electricity.

Furthermore, as described above, in the liquid crystal panel, the lighting inspection is performed before the external circuits have been installed. At this time, generally, some or all the signal lines are supplied with the same signal or a plurality of the scanning lines are electrically bundled in a simple manner so that the inspection is readily carried out with more efficiency. Therefore, an area, which is to be cut off upon completion of the lighting inspection, is provided with terminals which are connected with some or all the signal lines for the lighting inspection, and terminals which are connected with a plurality of the scanning lines for the lighting inspection. Upon completion of the lighting inspection, these terminals are cut off from the signal lines and the scanning lines so as to allow each of the signal lines and the scanning lines to be electrically independent.

Furthermore, in the active-matrix substrate, it is desirable that the resistance value of the fourth protecting circuit be set smaller than that of the first protecting circuit and be more than 20 times the resistance value of one spare wire.

With the above-mentioned arrangement, the resistance value of the fourth protecting circuit is set within the above-mentioned range so that electric charge can be released to another spare wire in a more positive manner, and it is possible to determine whether the resistance is sufficiently low or not at the connecting portions upon correcting defects on lines by using laser.

Moreover, in the active-matrix substrate, it is desirable that an area, which is to be cut off upon completion of the lighting inspection, be provided with fifth protecting circuits which connect the terminals for the lighting inspection of the scanning lines and/or which connect the terminals for the lighting inspection of the signal lines, and sixth protecting circuits for connecting the spare wires and the scanning lines and/or for connecting the spare wires and the signal lines.

Since the above-mentioned arrangement is provided with the fourth and the fifth protecting circuits, it is possible to further prevent puncture from occurring at the intersections of the spare wires and the signal lines or the scanning lines as compared with the case in which static electricity is received in accordance with the number of the disposed spare wires, and to prevent degradation in property of the TFT elements that is caused by a surge of the potential.

This is because the number of the spare wires is generally limited merely to a few more than ten; meanwhile, the number of the signal lines and the scanning lines is arranged so as to range from several hundreds to several thousands in accordance with the display capacity. Therefore, when all these lines are connected with the first through third protecting circuits, the voltage is reduced to from one several hundredths to one several thousandths with regard to the same amount of electric charge.

Further, in the case when each of the terminals for the lighting inspection of the scanning lines is connected with a plurality of the scanning lines in a manner so as to bundle a plurality of the scanning lines, and each of the terminals for the lighting inspection of the signal lines is connected with a plurality of the signal lines in a manner so as to bundle a plurality of the signal lines, the fifth protecting circuits make it possible to prevent puncture more effectively. In the arrangement in which the protecting circuits are provided between the lines, voltage is reduced in accordance with a time constant, which is determined by the same resistance value as that of the resistance of the protecting circuits that is inserted in a series between the lines; meanwhile, in the above-mentioned arrangement, the scanning lines and the signal lines have been electrically bundled so that electric charge expands merely depending upon the resistance value of the fifth protecting circuits which are disposed between the bundled wires. Further, electric charge rapidly expands into all the bundled wires; consequently, this arrangement does not cause potential gradient due to a distance from the electrostatically charged spare wire so that it is possible to positively prevent puncture, etc. from occurring.

Furthermore, in the active-matrix substrate, it is desirable that the fourth through sixth protecting circuits be provided with two diode-type semiconductor elements which are parallel-connected in the opposite direction from each other.

With the above-mentioned arrangement, the fourth through sixth protecting circuits have so called diode ring structures, and the fourth protecting circuit is capable of releasing electric charge to another spare wire with regard to any one of the adjacent spare wires that is subjected to static electricity.

Moreover, in the case when the fourth through sixth protecting circuits are arranged as described above, it is possible to form the diode-type semiconductor elements by making use of a process for forming the TFT elements on the substrate; thus, it is possible to prevent an increase in the number of steps.

Furthermore, in the active-matrix substrate, with regard to the fourth protecting circuit, it is desirable to set a larger ratio of the channel width to the channel length of the diode-type semiconductor element as compared with the ratio of the first protecting circuit, and it is desirable to set the ratio at not more than 3000.

With the above-mentioned arrangement, the ratio of the channel width to the channel length of the diode-type semiconductor element is set within the above-mentioned range so as to release electric charge to another spare wire and so as to determine whether the resistance is sufficiently low at the connecting portions upon correcting defects on lines by using laser. Therefore, it is possible to positively prevent the puncture and degradation in property of the TFT elements, and it is further possible to smoothly inspect the resistance at the connecting portions upon correcting defects on lines.

Furthermore, with regard to the active-matrix substrate, in the fourth protecting circuit, it is desirable that a gate insulating film of the semiconductor element include no anodic oxide film of gate electrodes, and in the first protecting circuit, it is desirable that a gate insulating film of the semiconductor element include an anodic oxide film of gate electrodes.

With the above-mentioned arrangement, the semiconductor element of the fourth protecting circuit includes no anodic oxide film of the gate electrodes; therefore, it is possible to reduce the resistance value.

The fourth protecting circuits are cut off after the lighting inspection so that a degree of seriousness is lower with regard to defects. For this reason, in order to realize an effective protecting circuit with a smaller area, it is effective to reduce the resistance value without anodic oxide film of gate electrodes, as described above.

Furthermore, in the active-matrix substrate, it is preferable to shield the first through fourth protecting circuits from light.

With the above-mentioned arrangement, in the case when the first through fourth protecting circuits are provided with the semiconductive layers, it is possible to prevent light shedding on the semiconductive layers from causing a pair of an electron and a positive hole that increases leakage current and allows the actual resistance value to shift from the predetermined resistance value, and it is possible to prevent light energy from accelerating a degradation in the semiconductive layer.

Further, an inspecting method of the active-matrix substrate is characterized by determining voltage applied to a resistance measuring device, which measures loop resistance, so as to allow a resistance value of the fourth protecting circuit to exceed 20 times a resistance value of one spare wire.

The above-mentioned arrangement makes it possible to readily determine whether the resistance is sufficiently low at the connecting portions upon correcting defects on lines by using laser.

In the case when defects are found on lines, it is necessary to electrically inspect whether the spare wires are connected with sufficiently low resistance after having been connected by using laser. In this case, this inspection is performed as follows: after a correction has been made by using the adjacent spare wires, loop resistance is measured between the adjacent spare wires via a portion connected by using laser.

For this reason, the resistance value via the fourth protecting circuit needs to be sufficiently larger than the loop resistance in order to find a correct resistance of the connection. Therefore, voltage applied to the resistance measuring device is determined so as to allow the resistance value of the fourth protecting circuit disposed between the spare wires to exceed 20 times the resistance value of one spare wire; thus, it is possible to smoothly inspect the resistance.

Furthermore, with regard to the inspecting method of the active-matrix substrate, it is preferable to pass a current of not more than 1 $\mu$A through a plurality of the corrected spare wires and to measure a voltage between the terminals, so that the loop resistance is measured.

With the above-mentioned method, an inspecting method, in which a current of not more than 1 $\mu$A passes through the spare wires so as to measure voltage between the terminals, is adopted; thus, it is possible to confirm whether the spare wires are connected with sufficiently low resistance by using laser in a more positive manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active-matrix substrate comprising:
   a substrate,
   a plurality of scanning lines which are disposed in parallel on said substrate,
   signal lines which are arranged in parallel so as to intersect said scanning lines on said substrate,
   a plurality of spare wires which are arranged on an input side and a non-input side of said signal lines and/or said scanning lines so as to intersect said signal lines and/or scanning lines, said spare wires being disposed for physical and direct connection to ones of the signal lines and/or the scanning lines that are defective due to electrical breaks therein, whereby, in use, the spare wires function as signal lines and/or scanning lines, and
   first protecting circuits which connect adjacent spare wires so as to prevent an undesired high voltage from being applied to one of said spare wires.

2. The active-matrix substrate as defined in claim 1, wherein said first protecting circuits each has a resistance value ranging from 2 M$\Omega$ to 400 M$\Omega$.

3. The active-matrix substrate as defined in claim 2, further comprising second protecting circuits which connect adjacent scanning lines and/or adjacent signal lines, and third protecting circuits which connect spare wires to scanning lines adjacent thereto and/or which connect spare wires to signal lines adjacent thereto.

4. The active-matrix substrate as defined in claim 3, wherein each of said first, second and third protecting circuits includes two diode-type semiconductor elements which are parallel-connected in the opposite direction from each other.

5. The active-matrix substrate as defined in claim 4, wherein in said first protecting circuits, said diode-type semiconductor element has a ratio of a channel width to a channel length that ranges from 0.4 to 30.

6. The active-matrix substrate as defined in claim 5, wherein in said first protecting circuits, said diode-type semiconductor element has a channel width of not more than 200 $\mu$m.

7. The active-matrix substrate as defined in claim 5, wherein in said first protecting circuits, said diode-type semiconductor element has a channel length of not less than 3 μm.

8. The active-matrix substrate as defined in claim 4, wherein in said third protecting circuits which connect spare wires to scanning lines adjacent thereto, said diode-type semiconductor element has a lower ratio of a channel width to a channel length as compared with the diode-type semiconductor elements of the first and second protecting circuits.

9. The active-matrix substrate as defined in claim 1, further comprising second protecting circuits which connect adjacent scanning lines and/or adjacent signal lines, and third protecting circuits which connect spare wires to scanning lines adjacent thereto and/or which connect spare wires to signal lines adjacent thereto.

10. The active-matrix substrate as defined in claim 9, wherein each of said first, second and third protecting circuits includes two diode-type semiconductor elements which are parallel-connected in the opposite direction from each other.

11. The active-matrix substrate as defined in claim 10, wherein in said first protecting circuits, said diode-type semiconductor element has a ratio of a channel width to a channel length that ranges from 0.4 to 30.

12. The active-matrix substrate as defined in claim 11, wherein in said first protecting circuits, said diode-type semiconductor element has a channel width of not more than 200 μm.

13. The active-matrix substrate as defined in claim 11, wherein in said first protecting circuits, said diode-type semiconductor element has a channel length of not less than 3 μm.

14. The active-matrix substrate as defined in claim 10, wherein in said third protecting circuits which connect spare wires to scanning lines adjacent thereto, said diode-type semiconductor element has a lower ratio of a channel width to a channel length as compared with the diode-type semiconductor elements of the first and second protecting circuits.

15. The active-matrix substrate as defined in claim 1, wherein the first protecting circuit is shielded from light.

16. The active-matrix substrate as defined in claim 1, further comprising terminals connected with said scanning lines for a lighting inspection, terminals connected with said signal lines for the lighting inspection, terminals connected with said spare wires for the lighting inspection, and second protecting circuits which connect adjacent spare wires, in an area which is to be cut off upon completion of the lighting inspection.

17. The active-matrix substrate as defined in claim 16, wherein said second protecting circuits each has a resistance value which is smaller than that of said first protecting circuits and is larger than 20 times the resistance value of one spare wire.

18. The active-matrix substrate as defined in claim 16, further comprising third protecting circuits which connect the terminals of adjacent scanning lines for the lighting inspection, and fourth protecting circuits which connect spare wires to scanning lines adjacent thereto and/or which connect spare wires to signal lines adjacent thereto.

19. The active-matrix substrate as defined in claim 18, wherein each of said second, third and fourth protecting circuits includes two diode-type semiconductor elements which are parallel-connected in the opposite direction from each other.

20. The active-matrix substrate as defined in claim 19, wherein in said second protecting circuits, said diode-type semiconductor element has a ratio of a channel width to a channel length that is larger than that of said first protecting circuits and is not more than 3000.

21. The active-matrix substrate as defined in claim 19, wherein: in said second protecting circuits, said semiconductor element has a gate insulating film that is formed without including an anodic oxide film of a gate electrode, and in said first protecting circuits, said semiconductor element has a gate insulating film that is formed, including an anodic oxide film of a gate electrode.

22. The active-matrix substrate as defined in claim 16, wherein said first protecting circuit is shielded from light.

23. An active-matrix substrate for a liquid crystal display device comprising:

a substrate;

parallel scanning lines arranged on said substrate so as to extend in a first direction;

parallel signal lines arranged on said substrate so as to extend in a second direction;

spare wires arranged on input sides and non-input sides of one or both of said signal lines and said scanning signal lines, the spare wires being disposed for physical and direct connection to ones of the signal lines and/or the scanning lines that are defective due to electrical breaks therein, whereby, in use, the spare wires function as signal lines and/or scanning lines; and first protecting circuits that connect adjacent ones of said spare wires,
wherein said first protecting circuits are operable when a high voltage is applied to one of said spare wires to dissipate the high voltage to other ones of said spare wires.

24. The active-matrix substrate as defined in claim 23, wherein each first protecting circuit is a non-linear semiconductor element.

25. The active-matrix substrate as defined in claim 23, wherein each first protecting circuit comprises diode-connected semiconductor elements connected in opposite directions between the corresponding adjacent ones of said spare wires.

26. The active-matrix substrate as defined in claim 23, further comprising:

second protecting circuits that connect adjacent ones of said scanning lines and that connect adjacent ones of said signal lines,
wherein said second protecting circuits are operable when a high voltage is applied to one of said scanning or signal lines to dissipate the high voltage to other ones of said scanning or signal lines.

27. The active-matrix substrate as defined in claim 26, wherein each second protecting circuit is a non-linear semiconductor element.

28. The active-matrix substrate as defined in claim 26, wherein each second protecting circuit comprises diode-connected semiconductor elements connected in opposite directions between the corresponding adjacent ones of said scanning lines or signal lines.

29. The active-matrix substrate as defined in claim 23, further comprising:

third protecting circuits that connect spare wires and signal lines adjacent thereto and that connect spare wires and scanning lines adjacent thereto, wherein said third protecting circuits are operable when a high voltage is applied to one of said spare wires to dissipate the high voltage to said scanning lines or signal lines.

30. The active-matrix substrate as defined in claim 29, wherein each third protecting circuit is a non-linear semiconductor element.

31. The active-matrix substrate as defined in claim 29, wherein each third protecting circuit comprises diode-connected semiconductor elements connected in opposite directions between the corresponding adjacent ones of said spare wires and signal lines or said spare wires and said scanning lines.

32. A liquid crystal display device comprising an active-matrix substrate as defined in claim 23, an opposing substrate, a sealing member for bonding said active-matrix substrate and said opposing substrate together with a gap therebetween, and a liquid crystal sealed in the gap between said active-matrix substrate and the opposing substrate.

* * * * *